US012580898B2

(12) United States Patent
Crabtree et al.

(10) Patent No.: US 12,580,898 B2
(45) Date of Patent: \*Mar. 17, 2026

(54) MASTER LEDGER AND LOCAL HOST LOG EXTENSION DETECTION AND MITIGATION OF FORGED AUTHENTICATION ATTACKS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/361,825

(22) Filed: Jul. 29, 2023

(65) Prior Publication Data

US 2024/0022546 A1    Jan. 18, 2024

Related U.S. Application Data

(63) Continuation-in-part of application No. 18/297,500, filed on Apr. 7, 2023, which is a continuation-in-part
(Continued)

(51) Int. Cl.
*H04L 9/40*        (2022.01)
*H04L 9/00*        (2022.01)
*H04L 9/32*        (2006.01)

(52) U.S. Cl.
CPC .......... *H04L 63/0428* (2013.01); *H04L 9/002* (2013.01); *H04L 9/3213* (2013.01);
(Continued)

(58) Field of Classification Search
CPC ... H04L 63/0428; H04L 9/002; H04L 9/3213; H04L 9/3236; H04L 9/3239;
(Continued)

(56) References Cited

U.S. PATENT DOCUMENTS 5,669,000 A    9/1997  Jessen et al.
6,256,544 B1   7/2001  Weissinger
(Continued)

FOREIGN PATENT DOCUMENTS

CN        105302532 B     6/2018
WO        2014159150 A1   10/2014
WO        2017075543 A1    5/2017

*Primary Examiner* — Cheng-Feng Huang
(74) *Attorney, Agent, or Firm* — Galvin Patent Law LLC; Brian R. Galvin

(57)        ABSTRACT

A system and method for implementation of zero trust computer network security combined with stateful authentication object tracking, authentication object manipulation and forgery detection, and assessment of authentication and identity attack surface. The methodology involves gathering all authentication objects issued by a network, storing the authentication objects in a master ledger for use in stateful deterministic authentication object tracking, and running detection functions that compare authentication objects presented for access to network resources with the master ledger. In an embodiment, an authentication object agent is installed at the domain controller level. In another embodiment, a log extension utility is installed at the local host computer level to provide additional log data for additional cyberattack detections.

16 Claims, 9 Drawing Sheets

Related U.S. Application Data of application No. 18/169,203, filed on Feb. 14, 2023, now abandoned, which is a continuation-in-part of application No. 17/245,162, filed on Apr. 30, 2021, now Pat. No. 11,582,207, which is a continuation of application No. 15/837,845, filed on Dec. 11, 2017, now Pat. No. 11,005,824, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned, application No. 18/361,825 is a continuation-in-part of application No. 17/986,850, filed on Nov. 14, 2022, which is a continuation-in-part of application No. 17/567,060, filed on Dec. 31, 2021, which is a continuation-in-part of application No. 17/389,863, filed on Jul. 30, 2021, now Pat. No. 11,792,229, which is a continuation of application No. 16/792,754, filed on Feb. 17, 2020, now Pat. No. 11,184,401, which is a continuation-in-part of application No. 16/779,801, filed on Feb. 3, 2020, now Pat. No. 11,032,323, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, which is a continuation of application No. 15/823, 363, filed on Nov. 27, 2017, now Pat. No. 10,560,483, which is a continuation-in-part of application No. 15/725,274, filed on Oct. 4, 2017, now Pat. No. 10,609,079, said application No. 17/567,060 is a continuation-in-part of application No. 17/170,288, filed on Feb. 8, 2021, now Pat. No. 11,570,204, which is a continuation-in-part of application No. 17/169, 924, filed on Feb. 8, 2021, now Pat. No. 11,570,209, which is a continuation-in-part of application No. 15/837,845, filed on Dec. 11, 2017, now Pat. No. 11,005,824, said application No. 17/567,060 is a continuation-in-part of application No. 17/102,561, filed on Nov. 24, 2020, now abandoned, which is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, which is a continuation-in-part of application No. 15/616,427, filed on Jun. 7, 2017, now abandoned, and a continuation-in-part of application No. 15/141,752, filed on Apr. 28, 2016, now Pat. No. 10,860,962, said application No. 17/986,850 is a continuation-in-part of application No. 17/105,025, filed on Nov. 25, 2020, now Pat. No. 11,503,066, which is a continuation of application No. 16/836, 717, filed on Mar. 31, 2020, now Pat. No. 10,917,428, which is a continuation-in-part of application No. 15/887,496, filed on Feb. 2, 2018, now Pat. No. 10,783,241, which is a continuation-in-part of application No. 15/823,285, filed on Nov. 27, 2017, now Pat. No. 10,740,096, which is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, which is a continuation-in-part of application No. 15/616,427, filed on Jun. 7, 2017, now abandoned, said application No. 15/887, 496 is a continuation-in-part of application No. 15/818,733, filed on Nov. 20, 2017, now Pat. No. 10,673,887, which is a continuation-in-part of application No. 15/725,274, filed on Oct. 4, 2017, now Pat. No. 10,609,079, application No. 18/361,825 is a continuation-in-part of application No. 17/683,242, filed on Feb. 28, 2022, which is a continuation-in-part of application No. 16/896,764, filed on Jun. 9, 2020, now Pat. No. 11,297,088, which is a continuation of application No. 16/191,054, filed on Nov. 14, 2018, now Pat. No. 10,681,074, which is a continuation-in-part of application No. 15/655,113, filed on Jul. 20, 2017, now Pat. No. 10,735,456.

(60) Provisional application No. 62/596,105, filed on Dec. 7, 2017, provisional application No. 62/568,291, filed on Oct. 4, 2017, provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,307, filed on Oct. 4, 2017.

(52) U.S. Cl.
CPC .......... *H04L 9/3236* (2013.01); *H04L 9/3239* (2013.01); *H04L 63/0807* (2013.01); *H04L 63/0815* (2013.01); *H04L 63/1425* (2013.01); *H04L 63/1433* (2013.01); *H04L 63/145* (2013.01); *H04L 9/50* (2022.05)

(58) Field of Classification Search
CPC ............. H04L 63/0807; H04L 63/0815; H04L 63/1425; H04L 63/1433; H04L 63/145; H04L 9/50
See application file for complete search history.

(56) References Cited

U.S. PATENT DOCUMENTS

| | | | |
|---|---|---|---|
| 6,477,572 | B1 | 11/2002 | Elderton et al. |
| 8,949,960 | B2 | 2/2015 | Berkman et al. |
| 10,462,112 | B1 | 10/2019 | Makmel et al. |
| 11,005,824 | B2 | 5/2021 | Crabtree et al. |
| 2003/0041254 | A1 | 2/2003 | Challener et al. |

(56)            References Cited

U.S. PATENT DOCUMENTS

| 2003/0145225 | A1 | 7/2003 | Bruton et al. |
| 2006/0224891 | A1* | 10/2006 | Ilac ...................... H04L 9/3213 |
| | | | 713/171 |
| 2007/0036314 | A1 | 2/2007 | Kloberdans et al. |
| 2007/0150744 | A1 | 6/2007 | Cheng et al. |
| 2009/0182672 | A1 | 7/2009 | Doyle |
| 2009/0199002 | A1 | 8/2009 | Erickson |
| 2009/0222562 | A1 | 9/2009 | Liu et al. |
| 2011/0087888 | A1 | 4/2011 | Rennie |
| 2012/0266244 | A1 | 10/2012 | Green et al. |
| 2014/0156806 | A1 | 6/2014 | Karpistsenko et al. |
| 2014/0205099 | A1* | 7/2014 | Christodorescu ....... H04L 9/321 |
| | | | 380/278 |
| 2014/0279762 | A1 | 9/2014 | Xaypanya et al. |
| 2015/0149979 | A1 | 5/2015 | Talby et al. |
| 2015/0169294 | A1 | 6/2015 | Brock et al. |
| 2015/0195192 | A1 | 7/2015 | Vasseur et al. |
| 2015/0281225 | A1 | 10/2015 | Schoen et al. |
| 2015/0317481 | A1 | 11/2015 | Gardner et al. |
| 2015/0379424 | A1 | 12/2015 | Dirac et al. |
| 2016/0028758 | A1 | 1/2016 | Ellis et al. |
| 2016/0072845 | A1 | 3/2016 | Chiviendacz et al. |
| 2016/0078361 | A1 | 3/2016 | Brueckner et al. |
| 2016/0275123 | A1 | 9/2016 | Lin et al. |
| 2016/0323280 | A1* | 11/2016 | Sade ................... H04L 63/0807 |
| 2016/0364307 | A1 | 12/2016 | Garg et al. |
| 2017/0019678 | A1 | 1/2017 | Kim et al. |
| 2017/0126712 | A1 | 5/2017 | Crabtree et al. |
| 2017/0139763 | A1 | 5/2017 | Ellwein |
| 2017/0149802 | A1 | 5/2017 | Huang et al. |
| 2017/0193110 | A1 | 7/2017 | Crabtree et al. |
| 2017/0322959 | A1 | 11/2017 | Tidwell et al. |
| 2017/0323089 | A1 | 11/2017 | Duggal et al. |
| 2018/0300930 | A1 | 10/2018 | Kennedy et al. |
| 2019/0082305 | A1 | 3/2019 | Proctor |
| 2020/0235935 | A1 | 7/2020 | Cerna, Jr. |

* cited by examiner

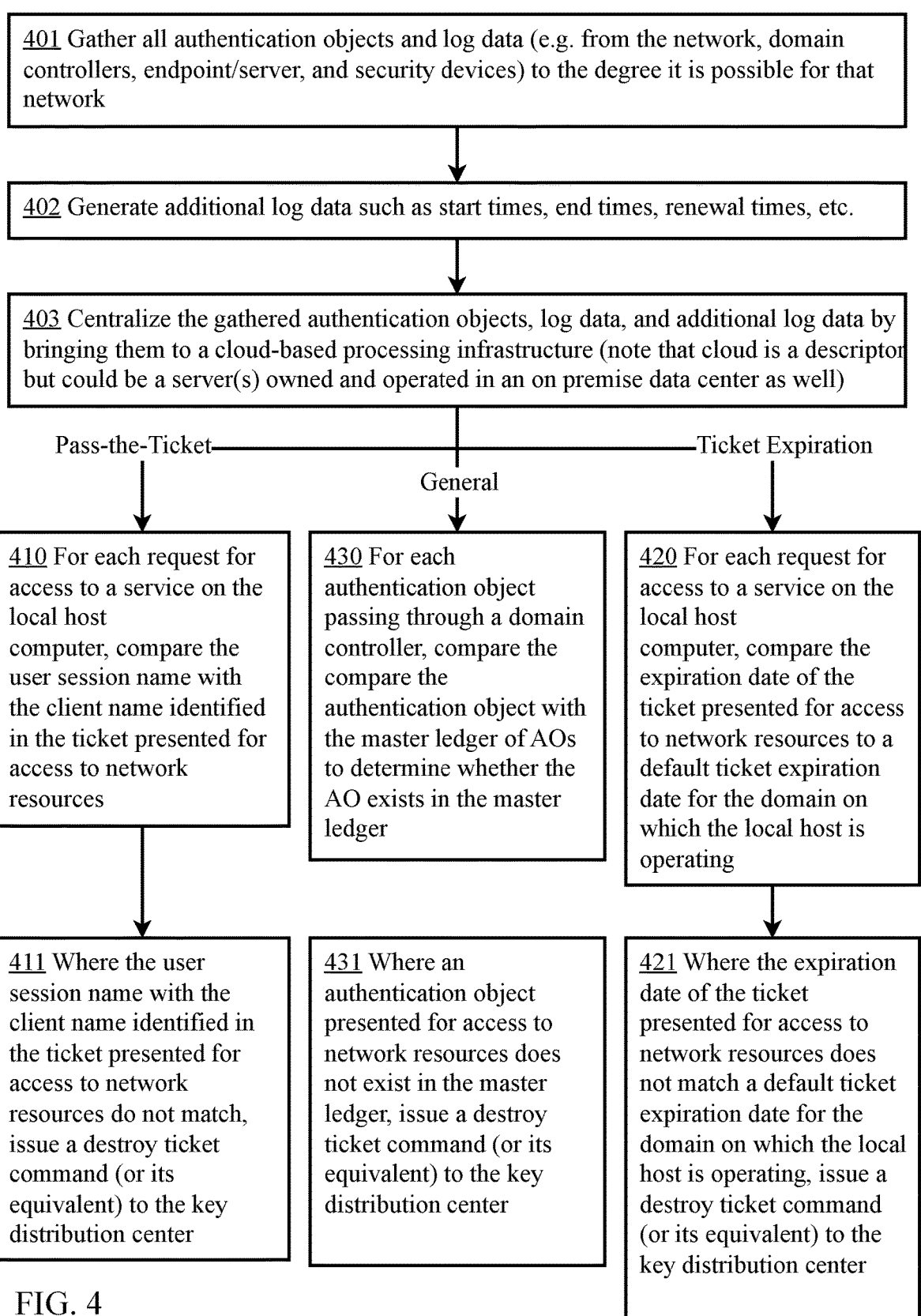

401 Gather all authentication objects and log data (e.g. from the network, domain controllers, endpoint/server, and security devices) to the degree it is possible for that network 402 Generate additional log data such as start times, end times, renewal times, etc.

403 Centralize the gathered authentication objects, log data, and additional log data by bringing them to a cloud-based processing infrastructure (note that cloud is a descriptor but could be a server(s) owned and operated in an on premise data center as well)

Pass-the-Ticket————————————————————————Ticket Expiration

General

410 For each request for access to a service on the local host computer, compare the user session name with the client name identified in the ticket presented for access to network resources 430 For each authentication object passing through a domain controller, compare the compare the authentication object with the master ledger of AOs to determine whether the AO exists in the master ledger 420 For each request for access to a service on the local host computer, compare the expiration date of the ticket presented for access to network resources to a default ticket expiration date for the domain on which the local host is operating 411 Where the user session name with the client name identified in the ticket presented for access to network resources do not match, issue a destroy ticket command (or its equivalent) to the key distribution center 431 Where an authentication object presented for access to network resources does not exist in the master ledger, issue a destroy ticket command (or its equivalent) to the key distribution center 421 Where the expiration date of the ticket presented for access to network resources does not match a default ticket expiration date for the domain on which the local host is operating, issue a destroy ticket command (or its equivalent) to the key distribution center

FIG. 4

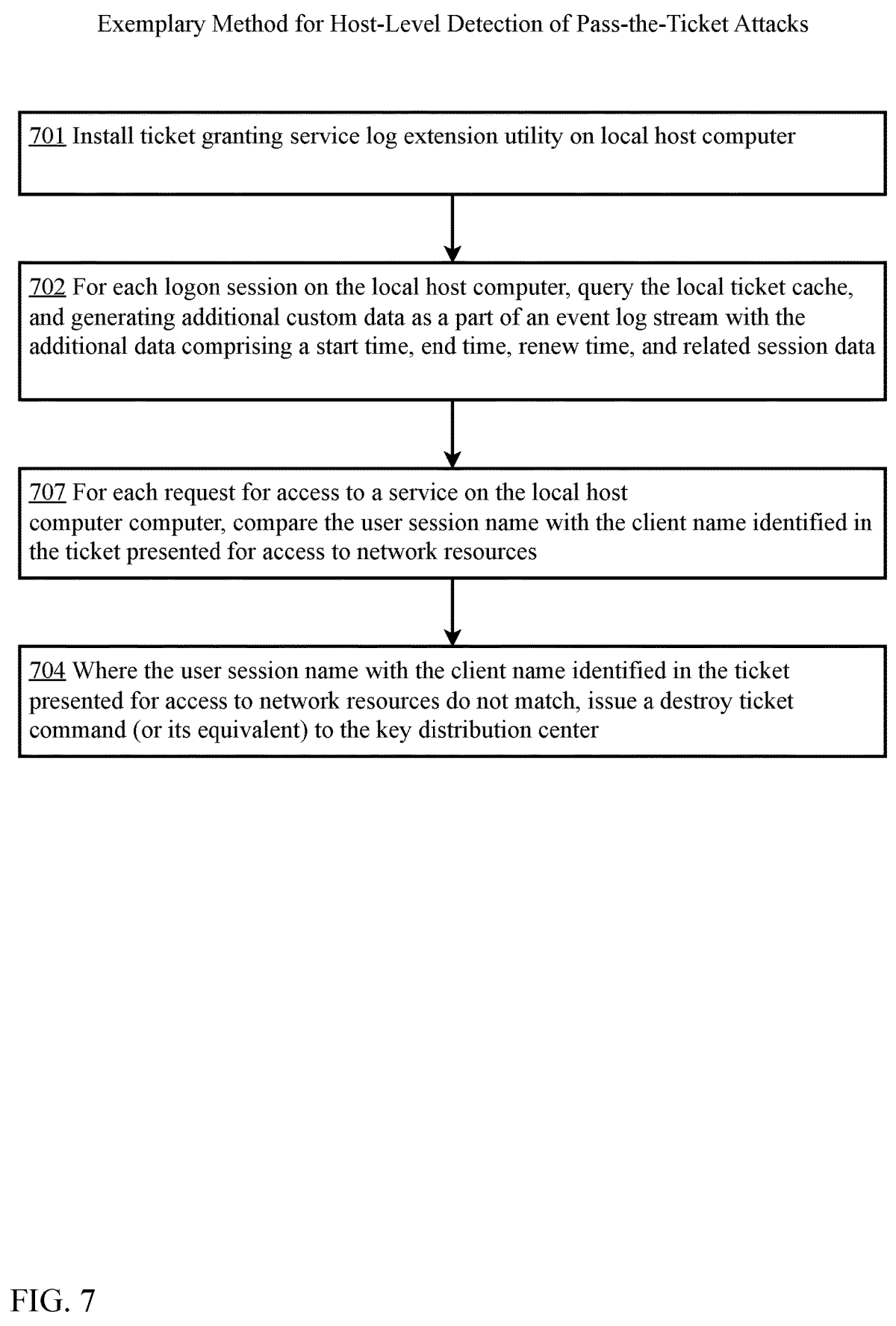

Exemplary Method for Host-Level Detection of Pass-the-Ticket Attacks

701 Install ticket granting service log extension utility on local host computer 702 For each logon session on the local host computer, query the local ticket cache, and generating additional custom data as a part of an event log stream with the additional data comprising a start time, end time, renew time, and related session data 707 For each request for access to a service on the local host computer computer, compare the user session name with the client name identified in the ticket presented for access to network resources 704 Where the user session name with the client name identified in the ticket presented for access to network resources do not match, issue a destroy ticket command (or its equivalent) to the key distribution center

FIG. 7

Figure 8:
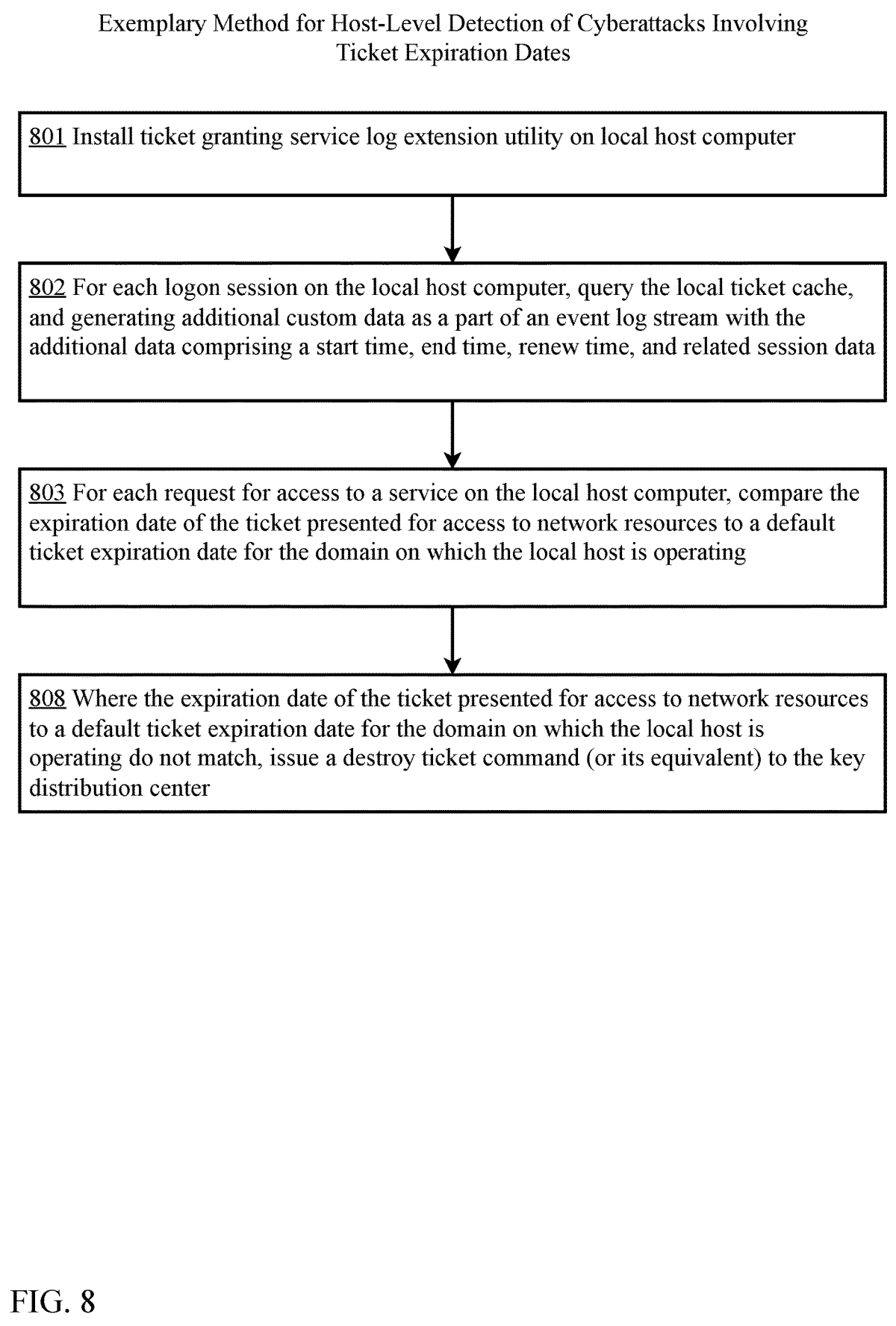

Exemplary Method for Host-Level Detection of Cyberattacks Involving
Ticket Expiration Dates <u>801</u> Install ticket granting service log extension utility on local host computer <u>802</u> For each logon session on the local host computer, query the local ticket cache, and generating additional custom data as a part of an event log stream with the additional data comprising a start time, end time, renew time, and related session data <u>803</u> For each request for access to a service on the local host computer, compare the expiration date of the ticket presented for access to network resources to a default ticket expiration date for the domain on which the local host is operating <u>808</u> Where the expiration date of the ticket presented for access to network resources to a default ticket expiration date for the domain on which the local host is operating do not match, issue a destroy ticket command (or its equivalent) to the key distribution center

MASTER LEDGER AND LOCAL HOST LOG EXTENSION DETECTION AND MITIGATION OF FORGED AUTHENTICATION ATTACKS

CROSS-REFERENCE TO RELATED APPLICATIONS

Priority is claimed in the application data sheet to the following patents or patent applications, each of which is expressly incorporated herein by reference in its entirety:
Ser. No. 18/297,500
Ser. No. 18/169,20
Ser. No. 17/245,162
Ser. No. 15/837,845
62/596,105
Ser. No. 15/825,350
Ser. No. 15/725,274
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 17/986,850
Ser. No. 17/567,060
Ser. No. 17/389,863
Ser. No. 16/792,754
Ser. No. 16/779,801
Ser. No. 16/777,270
Ser. No. 16/720,383
Ser. No. 15/823,363
Ser. No. 15/725,274
Ser. No. 17/170,288
Ser. No. 17/169,924
Ser. No. 15/837,845
Ser. No. 17/102,561
Ser. No. 15/790,457
Ser. No. 15/790,327
62/568,291
Ser. No. 15/616,427
Ser. No. 15/141,752
62/568,298
Ser. No. 17/105,025
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
62/568,305
62/568,307
Ser. No. 15/818,733
Ser. No. 15/725,274
Ser. No. 17/683,242

2

Ser. No. 16/896,764
Ser. No. 16/191,054
Ser. No. 15/655,113

BACKGROUND OF THE INVENTION

Field of the Art

The present invention is in the field of computer network security, and more particularly detection and mitigation of cyberattacks involving forged authentications.

Discussion of the State of the Art

In recent years, cybersecurity has been moving from a paradigm of perimeter-based networks to a modern paradigm of Zero Trust networks. In the perimeter-based network security paradigm, the perimeter of the network is protected by firewalls, demilitarized zones, anti-virus programs, and intrusion-prevention and detection systems. Log management, SIEM, SOAR and EDR tools also provide core capabilities but focus on initial intrusion detection and prevention. Users and devices "inside" the perimeter of the network are trusted devices and can access many or most network resources based on traditional authentication and authorization processes. Perimeter-based networks were appropriate when most users and devices were located onsite at the same physical location or were connected between multiple physical locations via virtual private networks. Now that networks are commonly spanning multiple geographic regions and physical environments (e.g. cloud and on-premise and at home), and users and devices on those networks can be located anywhere in the world while accessing data and applications, perimeter-based security is woefully inadequate.

The zero trust network paradigm has been proposed as the next generation of network and security operations. Unfortunately, current implementations of the zero trust paradigm are lacking, and themselves contain significant flaws and security vulnerabilities—in particular seams in the concept stemming from an inadequate focus on verification of all authentication process steps and limitations in the NTLM, Kerberos, and SAML/Oauth2 protocols on which authentication object exchange is ultimately conducted in many practical configurations. Flaws of note in existing implementations are that there is no stateful, deterministic means for detecting authentication forgeries, and there is currently no way to know either what proportion of the network's traffic comprises lower-security protocols, or what proportion of users, devices, and transactions already within a network are threats to the network's security. Simply put, current Zero Trust architectures and approaches fail to keep track of all the keys to the kingdom issued by IdPs.

What is needed is a system and method for zero trust network security combined with stateful authentication capture, persistence and analysis which enables both deterministic authentication object forgery and manipulation detection, additional heuristic and model-based analytics, and broader assessment of the level of authentication-specific vulnerabilities from any potential threat already existing within a network. Additionally, organizations require an ability to handle federated trusts, legacy protocols and cryptography capabilities to help them gauge overall security posture and ongoing improvement initiatives related to core Identity and Zero Trust principles.

SUMMARY OF THE INVENTION

Accordingly, the inventor has conceived and reduced to practice, a system and method for implementation of zero trust computer network security combined with stateful authentication object tracking, authentication object manipulation and forgery detection, and assessment of authentication and identity attack surfaces across on premise and cloud environments. The methodology involves gathering all authentication objects issued by a network, storing the authentication objects in a master ledger for use in stateful deterministic authentication object tracking, and running detection functions that compare authentication objects presented for access to network resources with the master ledger. In an embodiment, an authentication object agent is installed at the domain controller level. In another embodiment, a log/authentication/packet collection capability is placed at span ports or network taps. In another embodiment, a log extension utility is installed at the local host computer level to provide additional log data for additional cyberattack detections.

As computing moves away from physical and on-premise enterprises towards more cloud-based and federated service offerings, a need arises for single-sign-on protocols, such as Security Assertion Markup Language (SAML) and closely related OAuth2 to provide a user-friendly single-sign-on experience across the federated service offerings. SAML, for example, uses an identity provider to generate an authentication object in which a user may use to access a plurality of federated service offerings within a domain, without the need to authenticate with each individual service. SAML, Kerberos, and OAuth2 are a widely used protocols in the art, and used applications such as, but not limited to, MICROSOFT'S Active Directory federated services, AZURE AD, OKTA, web browser single-sign-on, and many cloud service providers (such as AMAZON AWS, AZURE, GOOGLE services, and the like). SAML is typically used for SSO in a wide variety government and enterprise applications (identity management), where backend system processing of XML is commonplace. Many government citizen ID schemes are also SAML based. The closely-related but open source OAuth2 is widely used in consumer and enterprise applications in authorization and authentication roles. Fast Identity Online (FIDO) is a cybersecurity authentication system that uses encrypted security keys (e.g., encrypted security keys stored on a USB stick) instead of passwords, but still relies on SAML/OAuth2 after the security key is utilized, so is subject to most of the same vulnerabilities.

Although convenient, standardization around stateless SSO technology creates an exploitable security weakness: once an identity provider becomes compromised, an attacker may generate forged authentication objects and masquerade as any user, gaining potentially free-reign to do whatever they please within the domain, or cloud equivalent, of the federated authentication or authorization service providers. While traditional cybersecurity approaches may suffice in situations where suspicious activity is noticed, an attacker savvy enough to blend their activity with the usual traffic may go undetected for extended periods of time using this forged authentication object. Attackers desire to become successfully authenticated traffic on a target network, making authentication attacks particularly effective and devastating for target organizations.

Detection and mitigation of manipulated and forged authentication object attacks across SAML, Kerberos, and OAuth2, and other authentication-object-based security protocols is important for fully-secure zero trust cybersecurity implementations. As described, herein, a master ledger of all issued authentication objects may be used to fill in the gaps in current zero trust cybersecurity implementations. In some embodiments, authentication object gathering agents (software utilities or extensions to a cybersecurity protocol such as Kerberos) may be installed at the domain controller level to gather all authentication objects and store them in a master ledger (also known as a global authentication record) which may be used to detect or prevent certain types of cybersecurity attacks.

In some embodiments, authentication log extension agents (software utilities or extensions to a cybersecurity protocol such as Kerberos) may be installed at the local host level to monitor access requests and to generate additional or supplemental log data which may be used to detect or prevent certain types of cybersecurity attacks. For example, host-level analytics and monitoring can be used to detect pass-the-ticket (PtT) and other attacks by storing every logon session on a network host, querying the local ticket cache, and generating additional custom data as a part of an event log stream such as a start time, end time, renew time, and related session data. This comprehensive log extension data can be used to identify cyberattacks by comparing the user session name with the client name identified in the ticket presented for access to network resources. This methodology allows detection and prevention of PtT attacks by identifying circumstances where tickets belonging to the wrong user are injected into memory and used to request access to network resources. This host-level analysis and monitoring can be extended to all network endpoints.

According to a preferred embodiment, a system for computer detection of forged authentication object cybersecurity attacks is disclosed, comprising: a computing device comprising a memory, a processor, and a non-volatile data storage device; an authentication object master ledger stored on the non-volatile data storage device, the authentication object master ledger comprising authentication objects captured from one or more domain controllers of a computer network; an authentication object agent installed on and operating on the one or more domain controllers of the computer network, the authentication object agent configured to capture each authentication object received by each of the domain controllers from a key distribution center and send it to an authentication object security system; the authentication object security system comprising a first plurality of programming instructions stored in the memory which, when operating on the processor, causes the computing device to: receive the authentication objects from the authentication object agent installed on and operating on the one or more domain controllers; and store each received authentication object or a unique identifier for each received authentication object in the authentication object master ledger; receive a first authentication object presented to a first domain controller of the one or more domain controllers from a first authentication object agent installed on and operating on the first domain controller, the first authentication object being presented for access to a resource of the computer network or a federated service associated with the computer network; compare the first authentication object or a unique identifier for the first authentication object with the master ledger to determine whether an identical authentication object or unique identifier already exists in the master ledger; and where the first authentication object or a unique identifier for the first authentication object is not contained in the master ledger, instruct the first authentication object agent to send a destroy ticket command from the first domain controller to the key distribution center.

According to another preferred embodiment, a method for computer detection of forged authentication object cybersecurity attacks is disclosed, comprising the steps of: storing an authentication object master ledger stored on a non-volatile data storage device of a computing device comprising a memory, a processor, and the non-volatile data storage device, the authentication object master ledger comprising authentication objects captured from one or more domain controllers of a computer network; installing an authentication object agent on the one or more domain controllers of the computer network, the authentication object agent configured to capture each authentication object received by each of the domain controllers from a key distribution center and send it to an authentication object security system; using the authentication object security system stored in the memory and operating on the processor of the computing device to: receive the authentication objects from the authentication object agent installed on and operating on the one or more domain controllers; and store each received authentication object or a unique identifier for each received authentication object in the authentication object master ledger; receive a first authentication object presented to a first domain controller of the one or more domain controllers from a first authentication object agent installed on and operating on the first domain controller, the first authentication object being presented for access to a resource of the computer network or a federated service associated with the computer network; compare the first authentication object or a unique identifier for the first authentication object with the master ledger to determine whether an identical authentication object or unique identifier already exists in the master ledger; and where the first authentication object or a unique identifier for the first authentication object is not contained in the master ledger, instruct the first authentication object agent to send a destroy ticket command from the first domain controller to the key distribution center.

According to an aspect of an embodiment, the computing device is part of the computer network.

According to an aspect of an embodiment, the computing device is part of a cloud-based service.

According to an aspect of an embodiment, the unique identifier stored for each received authentication object is a cryptographic hash of each authentication object, and the unique identifier for the first authentication object is a cryptographic hash of the first authentication object.

According to an aspect of an embodiment, the authentication objects are tickets issued by a ticket granting service of the key distribution center.

According to an aspect of an embodiment, an authentication object log extension database is stored on the non-volatile data storage device, the authentication object log extension database comprising additional log data for authentication objects issued by the key distribution center, the additional log data comprising a start time, an end time, and a renewal time for each authentication object issued by the key distribution center; and the authentication object log extension utility is installed on and operating on one or more local host computers of the computer network, the authentication object log extension utility configured to perform the following for the local host computer on which it is installed: enumerate every logon session on the local host computer; query the local ticket cache of the local host computer to obtain a log data stream for each logon session; generate the additional log data to supplement the log data stream for each logon session; and store the additional log data as part of the log data stream for the logon session; and the authentication object security system is further configured to cause the computing device to: receive the additional log data generated by the authentication object log extension utility for each local host computer of the one or more local host computers; monitor access requests by a client operating on a first local host computer of the one or more local host computers for access to resources on the computer network; identify a first authentication object presented by a first local host computer for access to a network resource of the computer network, the first authentication object comprising a client name; retrieve a user session name from the first local host computer associated with the attempted access using the first authentication object; compare the client name with the user session name; and where there is a mismatch between the client name and user session name, send a destroy ticket command to the key distribution service.

BRIEF DESCRIPTION OF THE DRAWING FIGURES

FIG. 4 is a flow diagram illustrating an exemplary method for performing authentication object forgery detection using global authentication record validation.

FIG. 7 is a flow diagram illustrating an exemplary detection of a pass-the-ticket attack using host-level ticket forgery detection to detect mismatched user names.

FIG. 8 is a flow diagram illustrating an exemplary detection of ticket forgery using host-level ticket forgery detection to detect unusual ticket expiration times.

DETAILED DESCRIPTION OF THE INVENTION

Figure 1:
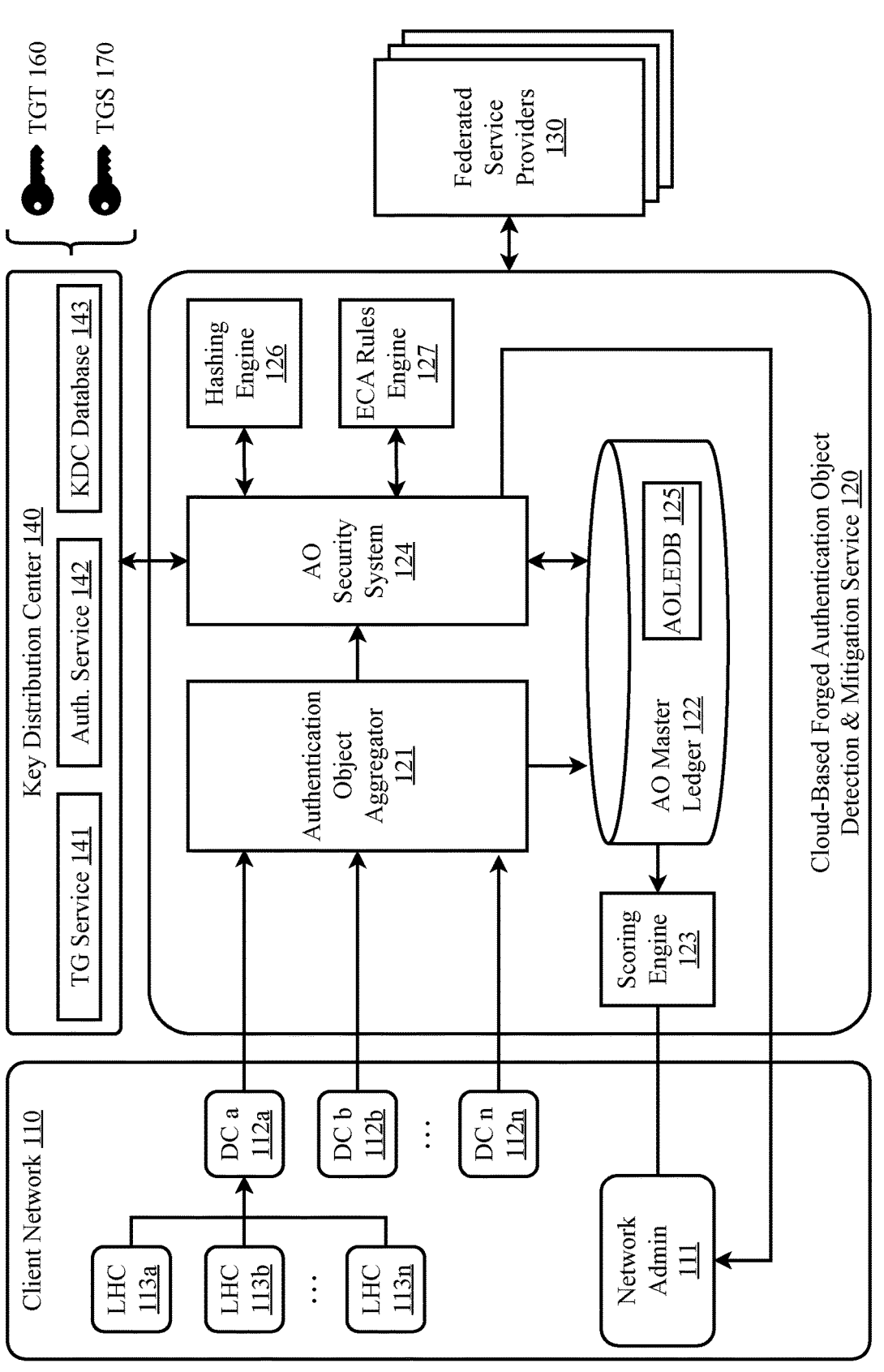
FIG. 1 is a flow diagram illustrating an exemplary system architecture for authentication object forgery detection using global authentication record validation.

The inventor has conceived, and reduced to practice, a system and method for implementation of zero trust computer network security combined with stateful authentication object tracking, authentication object manipulation and forgery detection, and assessment of authentication and identity attack surface. The methodology involves gathering all authentication objects issued by a network, storing the authentication objects in a master ledger for use in stateful deterministic authentication object tracking, and running detection functions that compare authentication objects presented for access to network resources with the master ledger. In an embodiment, an authentication object agent is installed at the domain controller level. In another embodiment, a log extension utility is installed at the local host computer level to provide additional log data for additional cyberattack detections.

Availability of observability and security data and the available bandwidth, computation and storage capabilities to evaluate it as part of a broad-based security and operational risk management program supports more contextual and effective approaches. Detection and mitigation of manipulated and forged authentication object attacks across SAML, Kerberos, and OAuth2, and other authentication-object-based security protocols is important for fully-secure zero trust cybersecurity implementations. As described, herein, a master ledger of all issued authentication objects may be used to fill in the gaps in current zero trust cybersecurity implementations. In some embodiments, authentication object gathering agents (software utilities or extensions to a cybersecurity protocol such as Kerberos) may be installed at the domain controller level to gather all authentication objects and store them in a master ledger (also known as a global authentication record) which may be used to detect or prevent certain types of cybersecurity attacks.

Existing identity assurance systems (e.g., Microsoft Defender for Identity (MDI), CrowdStrike Falcon Identity, and others) deploy on domain controllers and operate by a combination of protocol monitoring and log based detections. All detection analytics are conducted on a customer's domain controllers and alerts are sent to the cloud services. These products are not much different from typical endpoint detection and response (EDR) algorithms where isolated signals from a single system determine if malicious activity has occurred. This deployment model severely limits the types of analytics and visibility these products can have which is why their identity forgery detections are primarily based on heuristics and user behavioral analytics where a learning period attempts to establish what is normal and what is malicious. For identity forgeries, especially on Active Directory, this method is prone to many false positives and easily bypassed with well-known and published techniques.

The master ledger and local host computer methodologies described herein provide a fundamentally different approach by collecting and consolidating the identity protocol data in the cloud which enables real-time, holistic, and deterministic detection of identity forgeries. In Active Directory, domain controllers (DCs) act as distributed identity providers, meaning that clients may authenticate to any DC and then request subsequent access to resources from any other DC. This works because the authentication protocol (Kerberos currently being the most widely used such protocol) is stateless and because DCs replicate key material amongst themselves regularly. However, this is precisely why the protocol monitoring and log based detections approach of existing identity assurance systems is flawed—only a subset of the authentication transactions is seen and there is no consolidated view of all the identity providers issuing authentication objects (e.g., DCs and/or external IdPs). master ledger and local host computer methodologies described herein offer several advantages over the protocol monitoring and log based detections approach of existing identity assurance systems. First, by collecting and processing all the transactions from every IdP and processing them in real-time, a complete global record of authentication transactions is created. This global authentication record (or master ledger) allows for stateful detections where forgeries can be detected directly by verifying with the master ledger whether a ticket or token has ever been validly issued, instead of guessing using heuristics as to whether an authentication attempt is using a forgery. Second, collecting authentication data at enterprise scale provides a unique data source that enables unique capabilities like Kerberos-based UEBA for anomaly detection, and other novel use cases like Active Directory trust analysis and weak encryption detection. Third, conducting analytics in the cloud puts far less resource strain on network's Tier 0 assets whereas existing identity assurance systems (e.g., MDI, Crowdsource Falcon Identity, etc.) routinely consume very large amounts of RAM and CPU for local processing. Fourth, cloud extensions multi-source data collection and consolidation helps detect cloud identity forgeries such as Golden SAML attacks. Golden SAML attacks were used in the devastating Solarwinds breach as a way to maintain persistent access to all of an enterprise's ADFS federated services. By stealing the Active Directory Federation Services (ADFS) signing certificates, the attackers were able to forge identities into the connected cloud services such as Azure, AWS, and many more. Using a similar detection methodology as used for Kerberos detections, the master ledger and local host computer methodologies described herein can successfully detect Golden SAML attacks by ingesting identity provider and service provider SAML/OAuth2 logs and creating real-time master ledger of authentication tokens issued. This type of detection utilizes telemetry centralization followed by data fusion at scale. Existing identity assurance methods simply cannot achieve the same level of identity security as the master ledger and local host computer methodologies described herein.

In some embodiments, authentication log extension agents (software utilities or extensions to a cybersecurity protocol such as Kerberos) may be installed at the local host level to monitor access requests and to generate additional or supplemental log data which may be used to detect or prevent certain types of cybersecurity attacks. For example, host-level analytics and monitoring can be used to detect pass-the-ticket (PtT) and other attacks by storing every logon session on a network host, querying the local ticket cache, and generating additional custom data as a part of an event log stream such as a start time, end time, renew time, and related session data. This comprehensive log extension data can be used to identify cyberattacks by comparing the user session name with the client name identified in the ticket presented for access to network resources. This methodology allows detection and prevention of PtT attacks by identifying circumstances where tickets belonging to the wrong user are injected into memory and used to request access to network resources. This host-level analysis and monitoring can be extended to all network endpoints.

In a typical embodiment, an external, and non-blocking validation, detection and response service may be used to supplement existing implementations using federated services that use a common identity provider or interact with any SSO related protocol. The service collects active tickets or tokens via generated cryptographic hashes corresponding to legitimately-generated authentication objects, and stores them in a master ledger. Incoming authentication objects are checked against the master ledger (which may be in a non-volatile database or an in-memory array, depending on configuration) and any authentication objects that are not contained in the master ledger are flagged as potentially-fraudulent SAML-based, Kerberos-based, or OAuth2-based authentication attempts. The system may also allow setting of a plurality of rules, heuristics or models (e.g. machine learning or statistical) to trigger events, insights, alerts or actions in downstream processes after certain conditions are satisfied.

In some embodiments, the system addresses the potential security threat by dynamically triaging and alerting or taking active measures when suspect or known forgeries or manipulations of authentication objects are detected. This active authentication validation and response technology may include dynamic authentication revocation of authentication objects when some combination of ticket/token, hash of authentication object, or supporting circumstantial evidence contextualizing access is meets or exceeds a specified objective risk function threshold. When tokens or tickets are presented without history of issuance, risk of forged authentications is greater. The ability to incorporate additional observed and derived (e.g. UEBA) data associated with the observation history can increase detection accuracy.

This active authentication process at a technical level can be extended to more detection of forged authentications as higher levels of abstraction (e.g., complex business processes) as well. For example, consider cybersecurity for a hospital which has adopted Epic Systems healthcare infrastructure as a system of record and Imprivata as a MFA/workflow authentication/authorization service that includes PKI enabled credential issuance and biometrics. A workflow incorporating biometrics, physical credentials, physical badge-in, potential video or camera evidence of facility presence, coupled with valid Kerberos/SAML/Oauth2 events linked to a sensitive process (e.g. prescribing opiates like Oxycodone in a hospital) can support a cyber-physical compilation of evidence tied to a specific business or operational function which is of interest to the individual, supervisors, the organization, and regulatory or law enforcement entities. Embodiments described herein can address this kind of federated oversight need by linking contextual and technical indicators of authentication or authorization manipulation or forgery in holistic fashion for both rule-based, statistical, and ML-based approaches. Responses may include "that was me" acknowledgements similar to credit card fraud alerts, MFA-based acceptance of responsibility or confirmation, peer or supervisor confirmation, active measures such as log outs or reauthentication, or active triggering of response actions such as account blocking, deprovisioning, or revocation of credentials at the application, KDC/IdP, ZTNA or NAC device, or network level (e.g. switch or firewall).

In some configurations, upon detection of an invalid authentication object, an administrative user is notified, and provided with access data associated with the invalid authentication object. In another embodiment of the invention, at least a portion of the access data comprises resources accessed by the owner of the invalid authentication object. In some configurations, at least a portion of the access data comprises blast radius data associated with the owner of the invalid authentication object.

In some embodiments, detection and prevention of ticket forgery cyberattacks may be implemented by improving host-level analytics and monitoring and extending the improved host-level analytics and monitoring to endpoints of a network. The methodology described herein comprises the use of a ticket-granting log extension utility which stores every logon session on a network, queries the local ticket cache, and generates additional custom data as a part of an event log stream with the additional data such as a start time, end time, renew time, and related session data. This comprehensive log extension data can be used to identify certain types of ticket forgery cyberattacks by comparing the user session name with the client name identified in the ticket presented for access to network resources and other means. This host-level ticket forgery detection can be extended to network endpoints for additional security.

Detecting ticket forgery cyberattacks on a network is difficult. As an example, pass-the-ticket (PtT) attacks where a valid ticket is reused by an attacker are difficult to detect because pass-the-ticket attacks behave in a manner expected for valid tickets. In a pass-the-ticket attack, an attacker exploits the authentication mechanism of the Windows domain environment to gain unauthorized access to network resources. The attack primarily targets the Kerberos authentication protocol, which is commonly used in Windows domains. The industry standard way of detecting PtT attacks is to use user behavioral analysis (UEBA) anomalies or heuristics that essentially guess when a ticket may be reused. These methods are unreliable when applied to PtT attacks, in part because Active Directory supports delegation as core capability. Kerberos delegation allows a service to authenticate to other services on behalf of a user, forwarding the user's credentials securely, allowing access to resources across multiple tiers without requiring users to reauthenticate. Since ticket reuse by an account other than the primary user is an expected behavior detecting PtT attacks using UEBA heuristics is unreliable.

Host-level analytics and monitoring can be used to detect PtT and other ticket-granting-type attacks by storing every logon session on a network host, querying the local ticket cache, and generating additional custom data as a part of an event log stream such as a start time, end time, renew time, and related session data. This comprehensive log extension data can be used to identify cyberattacks, for example, by comparing the user session name with the client name identified in the ticket presented for access to network resources. This methodology allows detection and prevention of PtT and other ticket-granting-type attacks by identifying circumstances where tickets belonging to the wrong user are injected into memory and used to request access to network resources. This host-level analysis and monitoring can be extended to network endpoints for additional security.

A PtT attack typically follows a series of stages: initial compromise, ticket theft, credential dumping, ticket usage, and privilege escalation and lateral movement, all of which exploit vulnerabilities in the Kerberos trust model. The attacker gains initial access to a system within the target Windows domain. This can be achieved through various methods, such as exploiting vulnerabilities, obtaining compromised credentials, or employing social engineering techniques. Once inside the compromised system, the attacker's goal is to extract valid Kerberos ticket-granting tickets (TGTs) or Service Tickets (TGS). These tickets are obtained by targeting the Local Security Authority Subsystem Service (LSASS) process memory, where the tickets of logged-in users are stored. The attacker employs various techniques and tools to extract the tickets from the LSASS process memory. Commonly used tools include Mimikatz, ProcDump, or similar memory-dumping utilities. By extracting the tickets, the attacker gains access to valid credentials issued by the Key Distribution Center (KDC). Armed with the stolen tickets, the attacker reuses them to authenticate themselves as the targeted user. In the Kerberos authentication process, when a service ticket is presented to a target server, the server trusts the ticket if it is signed by the domain's Key Distribution Center (KDC). By reusing valid tickets, the attacker can present legitimate service credentials to gain access to network resources without needing the user's actual credentials. With unauthorized access to a system or service, the attacker can explore the network, escalate privileges, and move laterally to compromise additional systems or access sensitive information. This allows them to expand their control and potentially cause more significant harm.

PtT attacks can be detected and prevented by installing a ticket granting log extension utility that enumerates every logon session on a system, queries the local ticket cache, and generates additional custom log data as a part of the event log data stream (e.g., Windows Event Log (WEL) stream), and using a ticket granting security service to monitor access requests to resources on a network, and performing various comparisons of the access request with the log data, as supplemented by the additional custom log data. This capability provides additional data about tickets that can't be obtained from the standard log data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Identity provider" and "key distribution service" as used herein mean a computer service that stores and verifies digital user and device identities for accessing computer resources. IdPs are typically cloud-hosted services, and they often work with single sign-on (SSO) providers to authenticate users. Identity providers typically rely on one or more authentication protocols such as Kerberos, Security Assertion Markup Language (SAML), or Open Authentication (OAuth). As used herein, the phrases "identity provider" and "key distribution service" are used interchangeably.

"Master ledger" or "global authentication record" as used herein mean a stored collection of authentication objects issued for access to computer resources of a network. Authentication objects will typically be issued by an identity provider, which may be a service external to the network. Authentication objects may be collected at the domain controller level by installing authentication object agents on domain controllers of the network. As used herein, the phrases "master ledger" and "global authentication record" are used interchangeably.

DETAILED DESCRIPTION OF DRAWING FIGURES

FIG. 1 is a flow diagram illustrating an exemplary system architecture for authentication object forgery detection using global authentication record validation. In this example, a client network is protected by a cloud-based forged authentication object detection and mitigation service (hereinafter "cloud-based service") 120 which implements zero trust network security combined with stateful deterministic authentication object tracking and assessment of the level of threat already existing within a client network 110 accessing one or more federated service providers 130 using a common key distribution center 140. Federated service providers 130 may comprise a group of trusted service partners that may share a common KDC 140. Examples of federated service providers 130 may be, for instance, services employing MICROSOFT'S ACTIVE DIRECTORY FEDERATED SERVICES (AS DS), AZURE AD, OKTA, many web browser single-sign-on (SSO) implementations, cloud service provides (such as, AMAZON AWS, AZURE, and GOOGLE), and the like.

Client network 110 comprises one or more domain controllers 112*a-n*, each of which is a domain controller for one or more local host computers 113*a-n*, and a network administrator portal 111 for management and administration of client network 110 by information technology (IT) and administrative personnel. Depending on configuration, an authentication object log extension utility may be installed on each local host computer 113*a-n*, configured to generate additional log data for the authentication log on the local host computer. Depending on configuration, an authentication object agent may be installed on each domain controller 112*a-n* to gather all authentication objects issued and/or presented for access by any local host computer 113*a-n* of client network 110. In this embodiment, cloud-based forged authentication object detection and mitigation service 120 operates at the cloud level, but other embodiments may have it operating either at the client network 110 level, the domain controller 112*a-n* level, or even at the local host computer 113*a-n* level.

Cloud-based service 120 provides additional cybersecurity for client network 110 in two primary ways. First, cloud-based service 120 creates a master ledger 122 of all authentication objects issued by key distribution center 140 for client network 100. Master ledger 122 is created by installing an AO agent on each domain controller 112*a-n* which gathers all AOs issued by KDC 140 as they arrive at each domain controller 112*a-n*. Authentication objects presented for access to network resources can be checked against master ledger 122 for validity. Any AO presented for access to network resources that is not contained in master ledger 122 is likely to be forged because it does not exist in master ledger 122. Master ledger 122 can also be used to score the network toxicity (i.e., the proportion of "good" AOs versus "bad" AOs) using a similar comparison. Second, cloud-based service 120 can provide local host level forged AO detection by creating an AO log extension database 125 which contains additional log information which can be used to identify forged AOs (tickets or tokens) such as ticket start time, a ticket end time, a ticket renewal time, and other related session data. AO log extension database 125 is created by installing an AO log extension utility on each local host computer 113*a-n* which generates the additional log data each time an authentication object is presented for access to network resources. Authentication objects presented for access to network resources can be checked against the additional log data in AO log extension database 125 for validity. Any AO presented for access to network resources that has different information than contained in AO log extension database 125 is likely to be forged.

Cloud-based service 120 comprises an authentication object (AO) aggregator 121, an AO master ledger 123, an authentication object (AO) security system 124, an AO log extension database 122 (which may be a component of AO master ledger 122), a scoring engine 123, a hashing engine 126, and an event, condition, action (ECA) rules engine 127. Authentication object security system 124 acting as a non-blocking intermediary between one or more local host computers 113*a-n* controlled by one or more domain controllers 112*a-n* of a client's computer network 110, a plurality of federated service providers (SP) 130, a key distribution center (KDC, also known as an identity provider (IdP)) 140, and an administrative user 923. Note that the exemplary configuration listed above is not intended to be limiting, and other configurations or rearrangements of the components listed above may be used in other embodiments. As one example, authentication object aggregator 121 and AO security system 124 are shown as separate components for clarity, but the functions of authentication object aggregator 121 may be incorporated into AO security system 124.

A network administrator 111 is responsible for establishing network access controls (NACs) which typically comprise settings for the Active Directory (AD) service for each domain controller 112*a-n* plus implementation of some authentication protocol such as Kerberos, New Technology LAN Manager (NTML), or Security Assertion Markup Language (SAML), OpenID, OAuth operating on each domain controller 112*a-n*. Each of these authentication protocols, however, has flaws and vulnerabilities that allow malicious actors to access resources within a network via cyberattacks such as silver ticket attacks and golden ticket attacks, in which the malicious actor is able to forge an authentication object, making it look as though it was issued by the authentication protocol. The malicious actor then uses the forged authentication object to access network resources. For purposes of clarity, Single Sign-On (SSO) is defined as a network security protocol that allows access to network resources within a single domain or organization, while a federated authentication allows access to network resources across domains or organizations. Kerberos and NTML are SSO network security protocols, while SAL, OpenID, and OAuth are federated network security protocols.

An implementation of zero trust network security which uses stateful, deterministic detection of authentication object forgeries provides greater security than heuristic methods, which rely on estimates or guesses as to whether forgeries may exist based on expected network behaviors. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Thus, cloud-based service 120 comprises an authentication object aggregator 121 for gathering of all authentication objects issued by domain controllers 112*a-n* operating their authentication protocols, a centralized database 122 for storing a complete record of every authentication issued by a client network 110 so that the original authentication can be concretely identified for every authentication object presented for every attempted access to a network resource, and a scoring engine 123 for scoring the completeness of the authentication observations, assessing the quality of the authentication observations, and assigning organization-specific penalty functions.

Authentication object security system 124 provides the additional functionality described above for other embodiments, except that it operates on in the cloud instead of on each local host computer 113*a-n*. More specifically, as with previous embodiments, an authentication object log extension utility is installed on each local host computer 113*a-n* as part of the local host's security protocol (e.g., as an extension to the Kerberos protocol) which enumerates every logon session on the local host, queries the local ticket cache, and generates additional custom data as a part of the log data stream (e.g., a Windows Event Log (WEL) stream) with the additional data. The authentication object log extension utility provides additional data about tickets that is not contained in typical security protocol logs, such as a ticket start time, a ticket end time, a ticket renewal time, and other related session data, which may be stored in authentication object log extension database 113 or may be stored as part of the log data stream if the security protocol being used allows additional information to be stored as part of the log data. However, rather than storing the additional data in a local authentication object log extension database, the authentication object log and the additional data generated by the authentication object log extension utility is forwarded to cloud-based service 120.

AO security system 124 may utilize a hashing engine and/or an ECA rules engine 127 for certain of its functionality. Hashing engine 126 may be configured to calculate a cryptographic hash for authentication objects (AOs) generated by KDC 140. A one-way hash may be used to allow protecting of sensitive information contained in the AO, but preserving uniqueness of each AO. Generated hashes may be stored in master ledger 122. Hashing engine may also run a hash check function, used for validating incoming AO's. ECA rules engine 127 may be used by a network administrator to create and manage ECA rules that may trigger actions and queries in the event of detection of a forged AO. Rules may be for example, tracking and logging the actions of the suspicious user, deferring the suspicious connection, and the like. Rules may be nested to create a complex flow of various conditional checks and actions to create a set of "circuit breaker" checks to further ascertain the connection, or try and resolve the matter automatically before notifying a human network administrator.

As one example of usage, authentication object security system 124 can detect PtT attacks by comparing the user session name with the client name identified in the ticket. A PtT involves tickets presented as being from one user session showing up in another user's login sessions. The session information is only available on local host computer 113, but is captured and forwarded to cloud-based service 120 by authentication object log extension utility and stored in authentication object log extension database 125. As authentication object log extension utility is installed on each local host computer 113, it has access to local host computer's 111 authentication object security protocol logs and can operate as an independent security protocol agent. For each login of local host computer 113 to a network resource forwarded to cloud-based service 120, authentication object security system 124 compares the user session name with the client name identified in the ticket. A mismatch between the user session name and client name indicates that a PtT attack may be occurring. Authentication object security system 124 can then either flag the issue for human intervention or can take an automated security action such as sending a ticket deletion requestion to key distribution center.

As another example of usage, authentication object security system 124 with its additional data (e.g., ticket start times, ticket end times, ticket renewal times, etc.) can be used to detect other forged ticket attacks. Common industry heuristics for forged ticket detections are enhanced by authentication object security system's 124 simpler and more accurate detection capabilities. For example, checking for abnormal ticket expiration and renew times is a cybersecurity heuristic to detect forged tickets and is a primary method of detecting attacks like Golden Tickets and other types of ticket manipulation. However, current methodologies for checking for abnormal ticket expiration and renew times are complicated because the log data does not store this information about tickets, so other means of doing the checking must be used. Authentication object security system 124 with its additional data (e.g., ticket start times, ticket end times, ticket renewal times, etc.) provides a simple and direct means for performing such checking, as the data necessary to perform the checking was stored at the time of ticket creation and can be readily accessed.

While this example shows a fully-cloud-based implementation in which authentication object aggregator 121, centralized database 122, and scoring engine 123 are all located on cloud-based service 120, other locations for these components are possible, including fully on-premise solutions (such as an a central office location having its own server network), and hybrid solutions wherein certain components are located on-premise and others are cloud-based. For example in another embodiment, authentication object aggregator 121 may be located on premise so as to avoid network traffic bottlenecks, and centralized database 122 and scoring engine 123 may be located on cloud-based service 120, with authentication object aggregator 121 transmitting issued authentications to centralized database 122 at off-peak times for network traffic.

Two other capabilities are made possible by use of a master ledger and/or local host detection, as described herein; namely, Active Directory trust utilization analysis and weak encryption detection.

Active Directory trust utilization refers to the implementation and usage of trust relationships within an Active Directory (AD) environment. Active Directory is a directory service developed by Microsoft that is commonly used in Windows-based networks to manage users, groups, computers, and other network resources. Active Directory trusts are established between domains or forests to facilitate the sharing of resources and authentication across different security boundaries. Trust relationships define a level of confidence and allow users from one domain to access resources in another domain or forest, based on the established trust. Using a master ledger ledger and/or local host detection as described herein can be used to identify all AD trust relationships within a network, allowing IT and administrative personnel to identify areas of vulnerability created by unnecessary or risky trust relationships.

Weak encryption detection can be performed by authentication object security system 124 with its additional data (e.g., ticket start times, ticket end times, ticket renewal times, etc.). This feature can be used to assist large organizations with sunsetting of their weak and/or obsolete cybersecurity protocols which would be impossible or impractical without use of a master ledger and/or local host detection, as described herein. For example, suppose an organization wants to disabling RC4 encryption across the organization. Windows Event Logs could be used to identify what accounts are using RC4, but Active Directory does not include critical data needed for such analysis in the native logs. This would result in disabling RC4 only for some accounts which would cause service disruption. The only way to identify all clients using RC4 accounts in a network is to monitor network traffic directly for each computer system which is not feasible using currently-available tools. Use of a master ledger and/or host level detection as described herein solves the problem as it is able to identify all local host computers, their encryption types, and, depending on configuration, additional log information generated specifically for the task.

Figure 2:
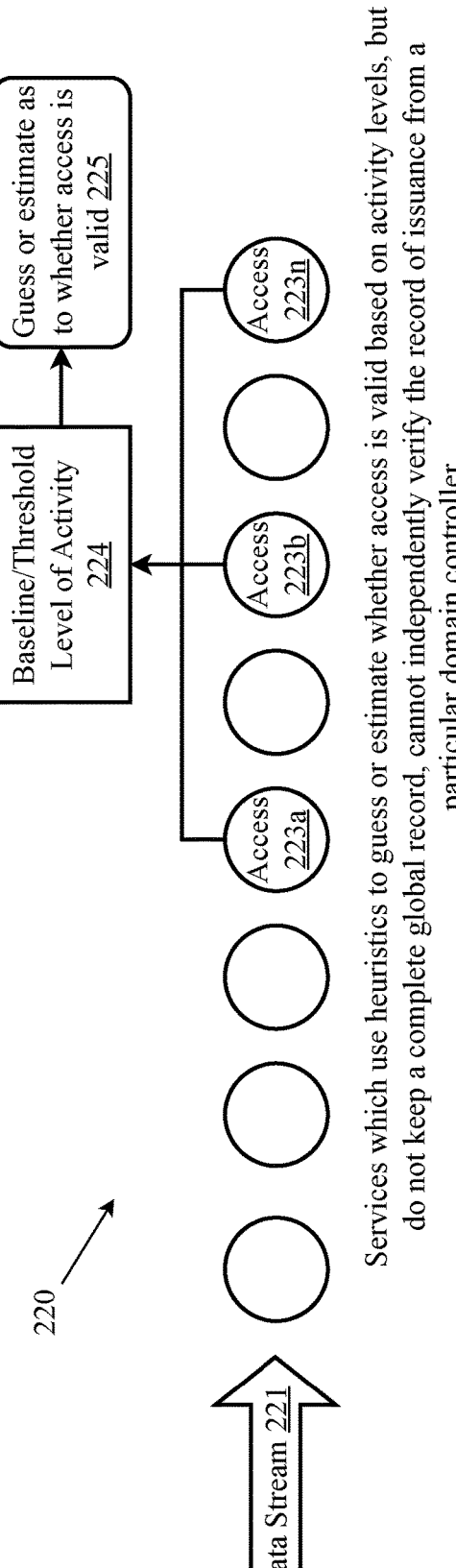
FIG. 2 is a diagram illustrating differences between global authentication record validation versus heuristic assessment validation.

FIG. 2 is a diagram illustrating differences between global authentication record validation versus heuristic assessment validation. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Here, heuristic detection of authentication object forgeries is contrasted with stateful, deterministic detection of authentication object forgeries. While heuristic detection is useful, it provides a lower level of protection because it relies on assumptions, estimates, and guesses instead of concrete, discretely-determinable facts.

In stateful, deterministic detection of authentication object forgeries as shown at 210, as streams of data 211 are received from a network every issuance 212 of an authentication object from every domain controller of the network is gathered by an authentication object aggregator 214 and stored in a centralized authentication object database 215. Each time an authentication object (i.e., ticket or token) is presented for access 213a-n to a network resource, authentication object aggregator 214 checks authentication object database 215 for existence in the database of the issuance claimed by that authentication object (i.e., ticket or token). If that issuance 212 exists in the database, the authentication object is granted access to the requested resource. If the issuance claimed by the authentication object does not exist in the database, then the authentication object is a forgery, which is statefully and deterministically confirmed by fact that no issuance of that authentication object can be found. Thus, in stateful, deterministic detection of authentication object forgeries, the existence of forgeries are facts which can be concretely and explicitly determines.

In heuristic detection of authentication object forgeries as shown at 220, no independent record of issuance of authentication objects is kept outside of the authentication protocol operating on each domain controller. Thus, as there is no independent, centralized way to confirm the authenticity of authentication objects, forgeries must be detected through application of heuristics (estimates, assumptions, and guesses). As streams of data 221 are received from a network, activity levels and behaviors of the network are stored 224 as baselines, and algorithms are applied (e.g., thresholds exceeded, unusual numbers of access requests made, accounts which have been dormant but are suddenly active, etc.) to guess or estimate as to whether access is valid 225. For example, each time an authentication object (i.e., ticket or token) is presented for access 223a-n to a network resource, that access attempt is stored as a data point. If the activity level of that authentication object suddenly increases, warnings may be issued to network administrators indicating that that authentication object may have been forged. As relies on assumptions, estimates, and guesses instead of concrete, discretely-determinable facts, it provides a lower level of protection than stateful, deterministic detection.

In the same way, authentication object security system 124 with its additional log data generated by authentication object log extension utility, can be used to detect forged ticket attacks using the methodologies discussed above.

Figure 3:
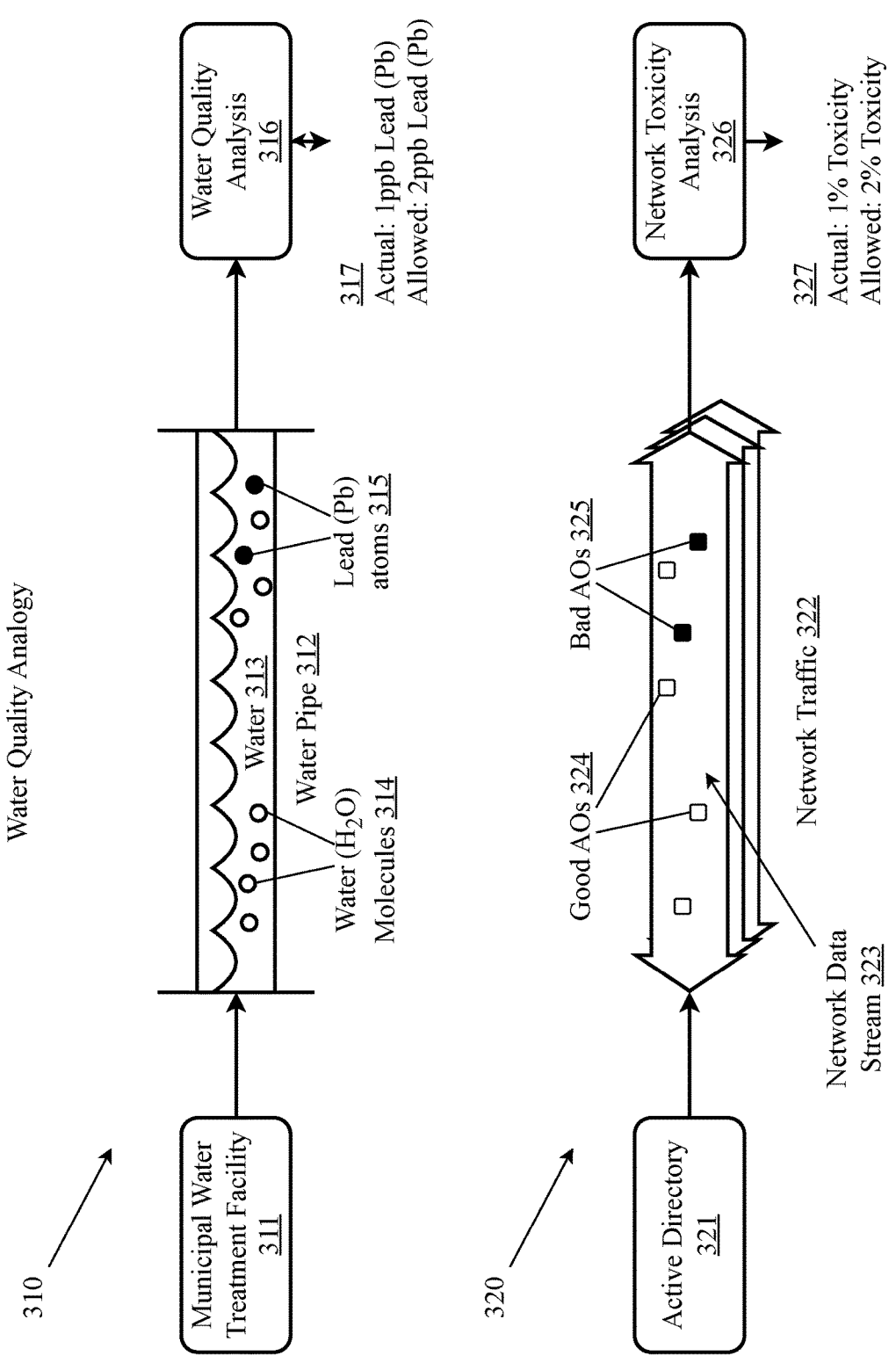
FIG. 3 is a diagram illustrating an analogy between authentication object forgery detection using global authentication record validation and water quality.

FIG. 3 is a diagram illustrating an analogy between authentication object forgery detection using global authentication record validation and water quality. One of the chief limitations of the zero trust network security paradigm is that network security (NS) and information technology (IT) staff need to consider both "good" and "bad" traffic. Detected attacks are tremendously valuable in this regard, but what is missing is the ability to measure the overall health of the authentication flow of a network. NS and IT staff need to know the ratio of good authentication traffic versus bad authentication traffic (which may be further broken down into known bad, potentially bad, and bad-looking but benign). These measures of the overall health of a network can be used to improve security and to assess the value of different security controls across IAM, PAM, PIM, and ITDR functions. As there is no perimeter security in a zero trust network (or if there is, it can't be relied upon completely), the proportions of good versus bad authentication traffic can help NS and IT staff to identify the relationship between authentication issues and broader events. It can help NS and IT staff reprioritize security information and event management (SIEM), incident investigation, or analysis based on links between identified or suspected bad authentication events and other indicators of instability (e.g. other detections or even crashes/crush dumps), authentication instability, or detected manipulation or authentication forgery.

Accordingly, a useful metric in such analysis is network "toxicity," defined as the proportion of "good" authentications in the network versus "bad" or less secure authentications. In other words, a network's toxicity is what proportion of the network's traffic comprises lower-security protocols, or what proportion of users, devices, and transactions already within a network are threats to the network's security.

Network "toxicity" can be analogized to a water quality report for municipal water systems which identifies the level of toxic substances in drinking water. For example, shown at 310 is the water quality portion of the analogy. A municipal water system 311 treats and provides water in accordance with drinking water regulations. Drinking water regulations are legally enforceable primary standards and treatment techniques that apply to municipal water systems. Primary standards and treatment techniques protect public health by limiting the levels of contaminants in drinking water. But having water quality standards does not ensure 100% pure water in a municipal system. In fact, contaminants are allowed to be in drinking water in limited quantities as long as the amount stays under a defined limit that has been determined to be safe for human consumption. For example, in the U.S., the chemical element mercury is highly toxic to humans, but is allowed to exist in drinking water up to 0.002 mg/L or 2 ppb. While it would be ideal not to have any toxic substances at all in municipal water systems, a perfect absence of them is impossible in any real-world water system. Therefore, acceptable limits of such contaminants have been established as a balance between health and practicality. Thus, the water 313 contained in any given water pipe 312 or other portion of the water system will have some high proportion of pure water (i.e., water molecules) 314 and some small proportion of contaminants such as lead (chemical symbol Pb) 315. A water quality report 316 is produced on a regular basis showing the levels of contaminants 317 in this case a lead (Pb) toxicity of 1 part per billion (ppb) actual versus 2 parts per billion (ppb) allowed (meaning that the water meets the standard even though it has some small level of the contaminant). The known levels of contaminants allow the municipal water system to make adjustments to its water treatment systems and procedures.

The levels of contaminants allowed may be different for small-scale systems (e.g., single family wells) versus large-scale systems (e.g., major municipal water systems) as they have different materials, lengths of pipe, storage capacities, and treatment methods. As a perfect absence of toxic substances is impossible or highly impractical, a balance must be struck between ensuring that water is generally safe for use within the reasonable operational constraints and associated degree of economic/life exposed to its underlying operating assumptions. However, that balance cannot be struck unless the level of contaminants (i.e., the level of toxicity) in the water is known.

The situation is similar for zero trust network security. In manner analogous to the public's reliance on the municipal water authority for provision of clean water, NS and IT professionals rely on standard Identity Providers (IdPs) 321 to ensure that traffic within the network is clean (i.e., that only the users that are authenticated and authorized have access to data). NS and IT professionals trust that traffic is clean because it is authenticated by a trusted source. Single Sign-on (SSO) in computer networks is loosely analogous to opening a faucet on a municipal water system. We trust the water that comes out of the faucet because we trust the water source in the same way that network services trust SSO tickets and tokens presented because they come from a trusted IdP. In both cases, we have previously established trust, but in both cases do not verify quality for every ounce of water or data transaction. When we request data or resources from a Service Provider (SP), whether it's an on premise file share or cloud service, it allows us access because we provide proof from an Identity Provider, a previously trusted source, that we're allowed to do so.

Similarly to having acceptable levels of contaminants in drinking water, there is some percentage of authentications in network traffic 322 that may also be "contaminated" in one way or another. As with water in municipal water systems, there will be a high proportion of "good" authentications in the network data streams 323, and a low proportion of "bad" authentication objects 325 in the network data streams 323. Current network security protocols have no way of measuring what portion of authentication traffic is "bad" such as authentications using weak protocols like NTLM, use of weak encryption like Rivest Cipher 4 (RC4), or even outright authentication forgeries like Golden Tickets or Golden SAML. This is true of any given IdP but even more striking when considering the common federation of Microsoft's® Active Directory and various IdP and SP infrastructure in modern enterprises. Without knowing the proportion of "good" versus "bad" authentications, it is not possible to determine what level of network "toxicity" is operationally acceptable to ensure that a network (or a process within a network) is generally safe and within the enterprise risk tolerance given the range of potential attack and disruption paths, For forgeries of Kerberos or SAML in modern systems the acceptable level may be approaching zero in much the same way that zero is the only acceptable level of lead in drinking water. However, for NTLM most enterprises have some level or risk tolerance for its use on the network as much as they would like to be rid of it. Regardless of what the imposed limit for network "contaminants" should be, the first step is measuring and monitoring the authentication contaminants in real-time with periodic snapshots/indexing of such data to support appropriate reporting and analysis. A network toxicity analysis 326 such as that described herein below would produce the necessary information 327 about network toxicity, for example, that the network has 1% actual toxicity versus 2% allowable toxicity. The levels of allowable toxicity will depend on a number of factors such as the type of computer network, the sensitivity of information on the computer network, the types of computing devices involved, other security measures that may be in place, and other factors.

FIG. 4 is a flow diagram illustrating an exemplary method for performing authentication object forgery detection using global authentication record validation. At step 401, all authentication objects and log data are gathered from the computer network (e.g. from the network, endpoint/server, and security devices) to the degree it is possible. The amount and quality of gathered objects may vary by organization or network. At step 402, additional log data is created such as start times, end times, renewal times, etc. At step 403, the gathered authentication objects, log data, and additional log data are centralized by bringing them to a cloud-based processing infrastructure. Note that while this embodiment uses a cloud-based processing infrastructure, other configurations are possible, including fully on-premise solutions (such as an a central office location having its own server network), and hybrid solutions wherein certain components are located on-premise and others are cloud-based.

At step 410, for each request for access to a service on the local host computer, the user session name is compared with the client name identified in the ticket presented for access to network resources. At step 411, where the user session name with the client name identified in the ticket presented for access to network resources do not match, a destroy ticket command (or its equivalent) is issued to the key distribution center.

At step 420, for each request for access to a service on the local host computer, the expiration date of the ticket presented for access to network resources is compared to a default ticket expiration date for the domain on which the local host is operating. At step 421, where the expiration date of the ticket presented for access to network resources to a default ticket expiration date for the domain on which the local host is operating do not match, a destroy ticket command (or its equivalent) is issued to the key distribution center.

At step 430, for each authentication object passing through a domain controller, compare the compare the authentication object with the master ledger of AOs to determine whether the AO exists in the master ledger. At step 431, where an authentication object presented for access to network resources does not exist in the master ledger, issue a destroy ticket command (or its equivalent) to the key distribution center.

Figure 5:
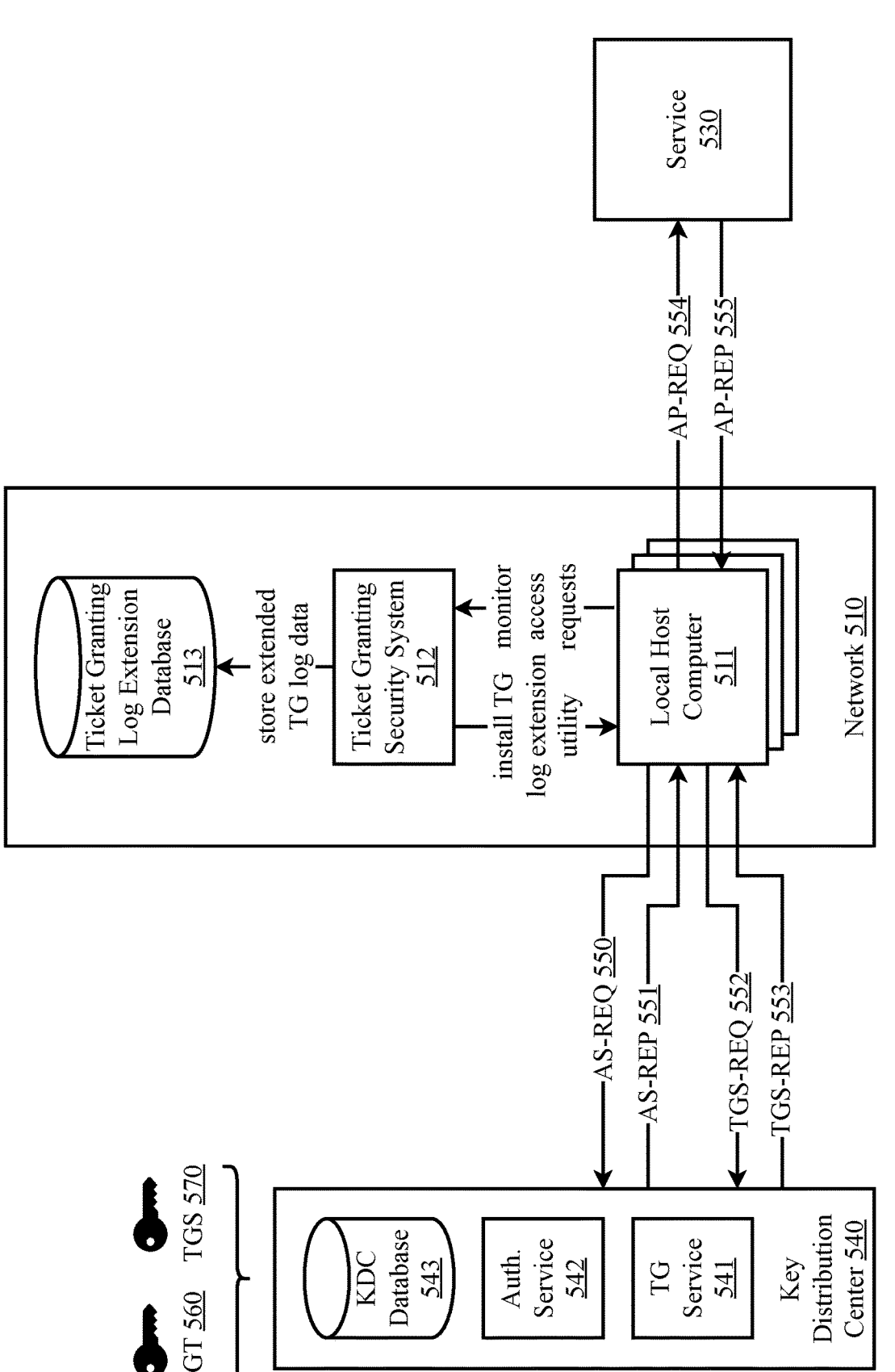
FIG. 5 is a block diagram illustrating an exemplary system architecture for extension of authentication object forgery detection to host-level ticket forgery detection.

FIG. 5 is a block diagram illustrating an exemplary system architecture for extension of authentication object forgery detection to host-level ticket forgery detection. While the term "ticket granting" is used herein for clarity based on existing ticket-granting-type security protocols, the term is not intended to be limiting, and the methodology described herein may be applied to any type of authentication object used at the local host computer level. Thus, the phrase "authentication object" may be substituted for the phrase "ticket granting."

In this embodiment, a ticket granting security system 552 is implemented in an organization's network and domain, but in other embodiments, ticket granting security system 552 may be cloud-based. For example, ticket granting security system 552 may be an implementation of, or a component of, AO security system 124 of FIG. 1. Ticket granting security system 552 comprises a ticket granting log extension database 553 and a ticket granting log extension utility installed on each local host computer 511 as part of the local host's security protocol (e.g., as an extension to the Kerberos protocol) which enumerates every logon session on the local host, queries the local ticket cache, and generates additional custom data as a part of the log data stream (e.g., a Windows Event Log (WEL) stream) with the additional data. The ticket granting log extension utility provides additional data about tickets that is not contained in typical security protocol logs, such as a ticket start time, a ticket end time, a ticket renewal time, and other related session data, which may be stored in ticket granting log extension database 553 or may be stored as part of the log data stream if the security protocol being used allows additional information to be stored as part of the log data.

Ticket granting security system 552 is installed on every local host where Kerberos ticket monitoring is needed. Local host computers may, in many cases, also be end point computers for network 550. An endpoint computer, in the context of computer networking and cybersecurity, refers to a device that acts as a point of entry or exit for data on a network. It is typically a user-operated device such as a desktop computer, laptop, smartphone, or tablet that interacts with a network or accesses network resources. Endpoints are called as such because they represent the endpoints of a network connection or communication. They can initiate communication with other devices or receive communication from other devices. Endpoints are usually equipped with networking capabilities and are connected to a network infrastructure, such as a local area network (LAN) or the internet, allowing them to send and receive data packets.

Securing of endpoint computers is particularly important in the field of cybersecurity as they are often targeted by malicious actors seeking to gain unauthorized access to networks or exploit vulnerabilities. Therefore, securing endpoint devices is crucial to maintaining the overall security of a network. This is typically achieved through various security measures, such as installing antivirus software, implementing firewalls, using strong passwords, and keeping software up to date with the latest security patches. Here, ticket granting security system 552 provides an additional layer of protection beyond these security protocols.

As one example of usage, ticket granting security system 552 can detect PtT attacks by comparing the user session name with the client name identified in the ticket. A PtT involves tickets presented as being from one user session showing up in another user's login sessions. The session information is only available on local host computer 511. As ticket granting security system 552 is installed on each local host computer 511, it has access to local host computer's 511 ticket granting security protocol logs and can operate as an independent security protocol agent. For each login of local host computer 511 to a network resource, ticket granting security system 552 compares the user session name with the client name identified in the ticket. A mismatch between the user session name and client name indicates that a PtT attack may be occurring. Ticket granting security system 552 can then either flag the issue for human intervention or can take an automated security action such as sending a ticket deletion requestion to key distribution center 580.

As another example of usage, ticket granting security system 552 with its additional data (e.g., ticket start times, ticket end times, ticket renewal times, etc.) can be used to detect other forged ticket attacks. Common industry heuristics for forged ticket detections are enhanced by ticket granting security system 552 simpler and more accurate detection capabilities. For example, checking for abnormal ticket expiration and renew times is a cybersecurity heuristic to detect forged tickets and is the primary method of detecting attacks like Golden Tickets and other types of ticket manipulation. However, current methodologies for checking for abnormal ticket expiration and renew times are complicated because the log data does not store this information about tickets, so other means of doing the checking must be used. Ticket granting security system 552 with its additional data (e.g., ticket start times, ticket end times, ticket renewal times, etc.) provides a simple and direct means for performing such checking, as the data necessary to perform the checking was stored at the time of ticket creation and can be readily accessed.

Ticket granting security system 552 operates as part of a ticket granting security protocol such as Kerberos. As Kerberos is a well-known current security protocol, it will be used herein as an example, but the disclosures herein are not limited to Kerberos and apply to any ticket granting security type protocol.

The Kerberos process begins when a user operating on a local host computer 511 (joined to the domain) attempts to access a service 530 either within the domain or externally to the domain (e.g., a federated service 130 as described in FIG. 1). Many services rely on the Kerberos authentication service such as Microsoft Windows Active Directory, FTP, SSH, POP, SMTP, NFS, Samba and others. The client machine 511 sends authentication information along with a timestamp and sends this as a message to a key distribution center (KDC) 580 comprising a ticket granting service (TGS) 581 and an authorization service (AS) 582. This message is referred to as AS-REQ 550 (authentication server—request) and is the first step in the Kerberos process.

Upon authentication, the KDC 580 issues a ticket-granting-ticket (TGT) 560 to the client encrypted with a special user on the domain controller known as krbtgt. The client cannot decrypt this ticket since the krbtgt hash is only stored on the domain controller and nowhere else. This step is known as the authentication server response or AS-REP 551.

In the third step, the client sends the TGT 560 back to the KDC 580 along with a request to access a service 530. This is called the TGS-REQ 552. The KDC 580 subsequently sends the client back a ticket-granting-service ticket 570 which allows a client operating on the local host computer 511 to access the actual service the user is interested in. This is the TGS-REP 553 step. During a golden ticket attack, as an example, the krbtgt hash is stolen and a forged TGS-REQ 552 is made effectively bypassing the client authentication step and granting the threat actor a legitimate TGS 570 ticket.

The fifth step in the Kerberos process occurs when the client operating on the local host computer 511 presents the TGS 570 ticket to the service 530 for evaluation. This step is known as AP-REQ 554. The final step, AP-REP 555, is a response from the service 530 either allowing or prohibiting access to the client operating on the local host computer 511 if the user is authorized. During a silver ticket attack, as an example, the attacker manages to extract the password or NT hash of a service account that allows them to forge a false TGS 570 ticket bypassing the KDC 580 altogether.

At each stage in the Kerberos process, a data packet is sent between the client operating on the local host computer 511 and either the KDC 580 or a service 530. In each instance, a packet capturing agent 551 (a packet capturing agent intercepts data being transmitted over a network) passively captures the data packet and stores the information contained inside in a multi-dimensional time-series database (MDTSDB) 552. The MDTSDB 552 stores the retrieved information in a ledger. Information from the data packets provide data points which may be stored in 553 and, depending on configuration, may be stored in the form of a graph which can be queried by graph traversal tools.

Other Kerberos attacks may be derived from captured Kerberos traffic as supplemented by the additional data supplied by ticket granting log extension utility. For example, an authoritative list known as a whitelist 554 or access-control list may be kept and contains all authorized Domain Controllers (DC) within the enterprise network along with additional data stored in ticket granting log extension database 553. Any attempt by a device to perform a Directory Replication Service (DRS) remote procedure call (or OpNum) of a certain number, namely 3, 5, and 57, is compared against the whitelist 554. If the DRS remote procedure call originates from a device not in the white list, this would indicate a DCSync (OpNum 3) attack or a DCShadow (OpNum 5 or 57) attack.

Similarly to the PtT detection process described above, ticket granting security system 552 can detect PtT attacks by comparing a change in the source IP address of a TGT within a narrow time-window. As an additional example, ticket granting security system 552 can detect Skeleton Key attacks by storing information about encryption levels used in granting tickets, and determining when encryption has been downgraded (typically from AES-528/256 to something weaker).

Figure 6:
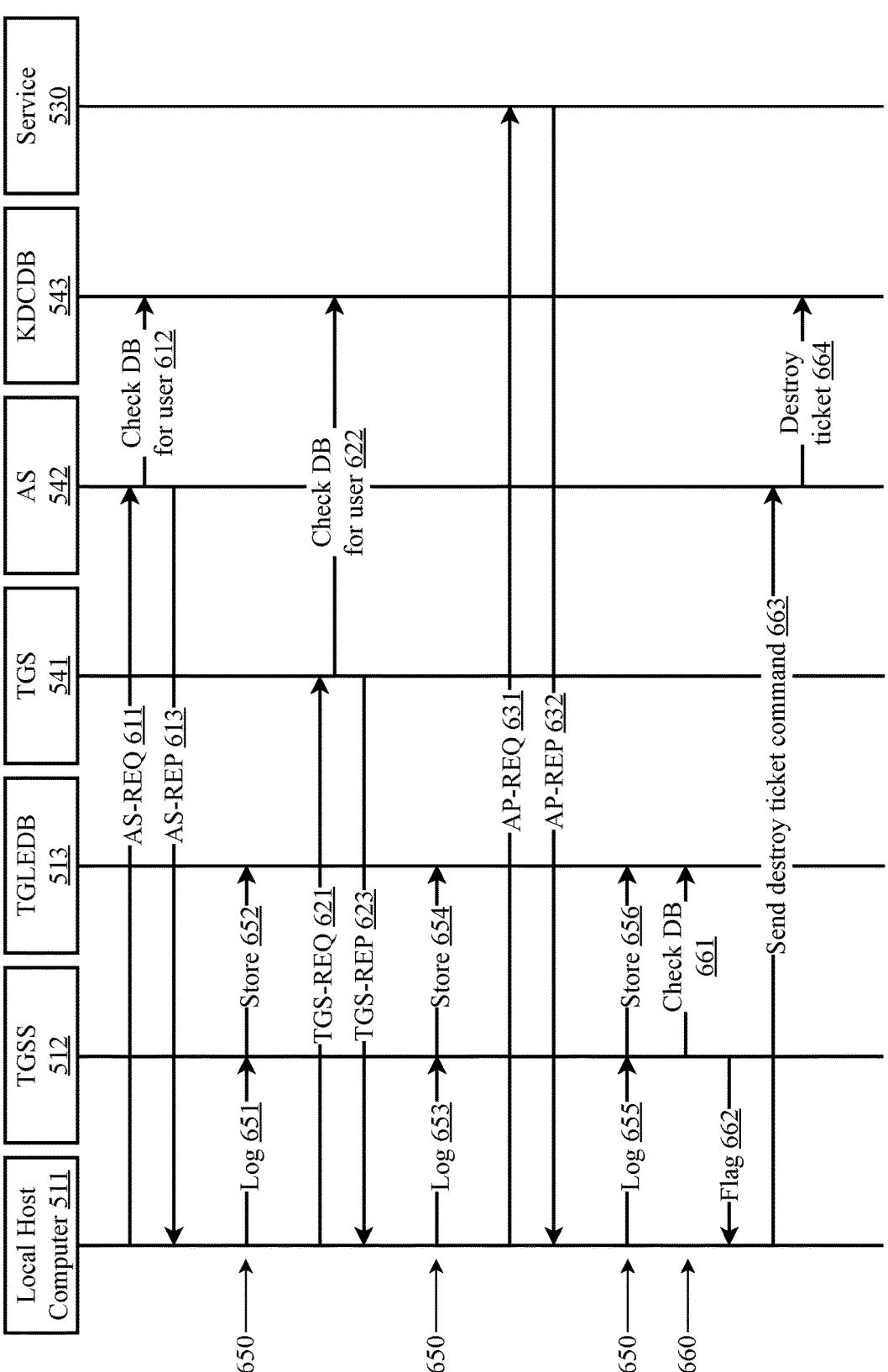
FIG. 6 is a messaging diagram illustrating an exemplary message flow for host-level ticket forgery detection.

FIG. 6 is a messaging diagram illustrating an exemplary message flow for host-level ticket forgery detection. This messaging diagram shows a typical Kerberos protocol operation with the operations of ticket granting security service (TGSS) 552 providing additional security protocols comprising a series of log and store steps 250 which generate and store the additional log data described above, and a verification procedure 260 showing an implementation of a PgT attack detection.

A client operating on local host computer 511 sends an AS-REQ 651 to authorization service 582 operating on key distribution center 580. Authorization service checks 652 key distribution center database (KDCDB) 583 for existence of the user in the database associated with the client operating on local host computer 511. Authorization service 582 sends AS-REP 653 back to local host computer 511 authorizing granting of ticket. TGSS 552 captures log data 251 and stores it 252 in ticket granting log extension database 553. Local host computer 511 sends TGS-REQ 261 to ticket granting service 581 operating on key distribution center 580. Ticket granting service 581 checks 622 key distribution center database (KDCDB) 583 for existence of the user in the database associated with the client operating on local host computer 511. Ticket granting service 581 sends TGS-REP 663 back to local host computer 511 granting ticket granting ticket. TGSS 552 captures log data 251 and stores it 252 in ticket granting log extension database 553. Local host computer 511 sends AP-REQ 271 to service 530 to which access has been granted. Service 530 sends AP-REP

272 back to local host computer 511 granting access. TGSS 552 captures log data 251 and stores it 252 in ticket granting log extension database 553.

At this point, verification procedure 260 is initiated in which TGSS 552 detects PtT attacks by comparing 261 the user session name on the local host computer with the client name identified in the ticket granting access to service 530. Upon discovery of a mismatch between user session name on the local host computer with the client name, TGSS 552 flags 262 the ticket as a possible PtT attack and causes local host computer 511 to send a destroy ticket command 263 to authentication service 582 to destroy both the ticket granting ticket issued by ticket granting service 581 and the ticket granting access to service 530. Authentication servic3 582 destroys the ticket in key distribution center database 583. The destruction of the tickets prevents further intrusion into network 550 by the detected PtT attack.

FIG. 7 is a flow diagram illustrating an exemplary detection of a pass-the-ticket attack using host-level ticket forgery detection to detect mismatched user names. At step 701, a ticket granting service log extension utility is installed on local host computer. At step 702, for each logon session on the local host computer, the local ticket cache is queried, and additional custom data is generated as a part of an event log stream such as a start time, end time, renew time, and related session data. At step 703, for each request for access to a service on the local host computer, the user session name is compared with the client name identified in the ticket presented for access to network resources. At step 704, where the user session name with the client name identified in the ticket presented for access to network resources do not match, a destroy ticket command (or its equivalent) is issued to the key distribution center. The destroy ticket command may be issued for a single ticket or for multiple tickets associated with local host computer 511 or a login event.

FIG. 8 is a flow diagram illustrating an exemplary detection of ticket forgery using host-level ticket forgery detection to detect unusual ticket expiration times. At step 801, a ticket granting service log extension utility is installed on local host computer. At step 802, for each logon session on the local host computer, the local ticket cache is queried, and additional custom data is generated as a part of an event log stream such as a start time, end time, renew time, and related session data. At step 803, for each request for access to a service on the local host computer, the user session name is compared with the client name identified in the ticket presented for access to network resources. At step 804, where the expiration date of the ticket presented for access to network resources to a default ticket expiration date for the domain on which the local host is operating do not match, issue a destroy ticket command (or its equivalent) to the key distribution center. The destroy ticket command may be issued for a single ticket or for multiple tickets associated with local host computer 511 or a login event.

Exemplary Computing Environment

Figure 9:
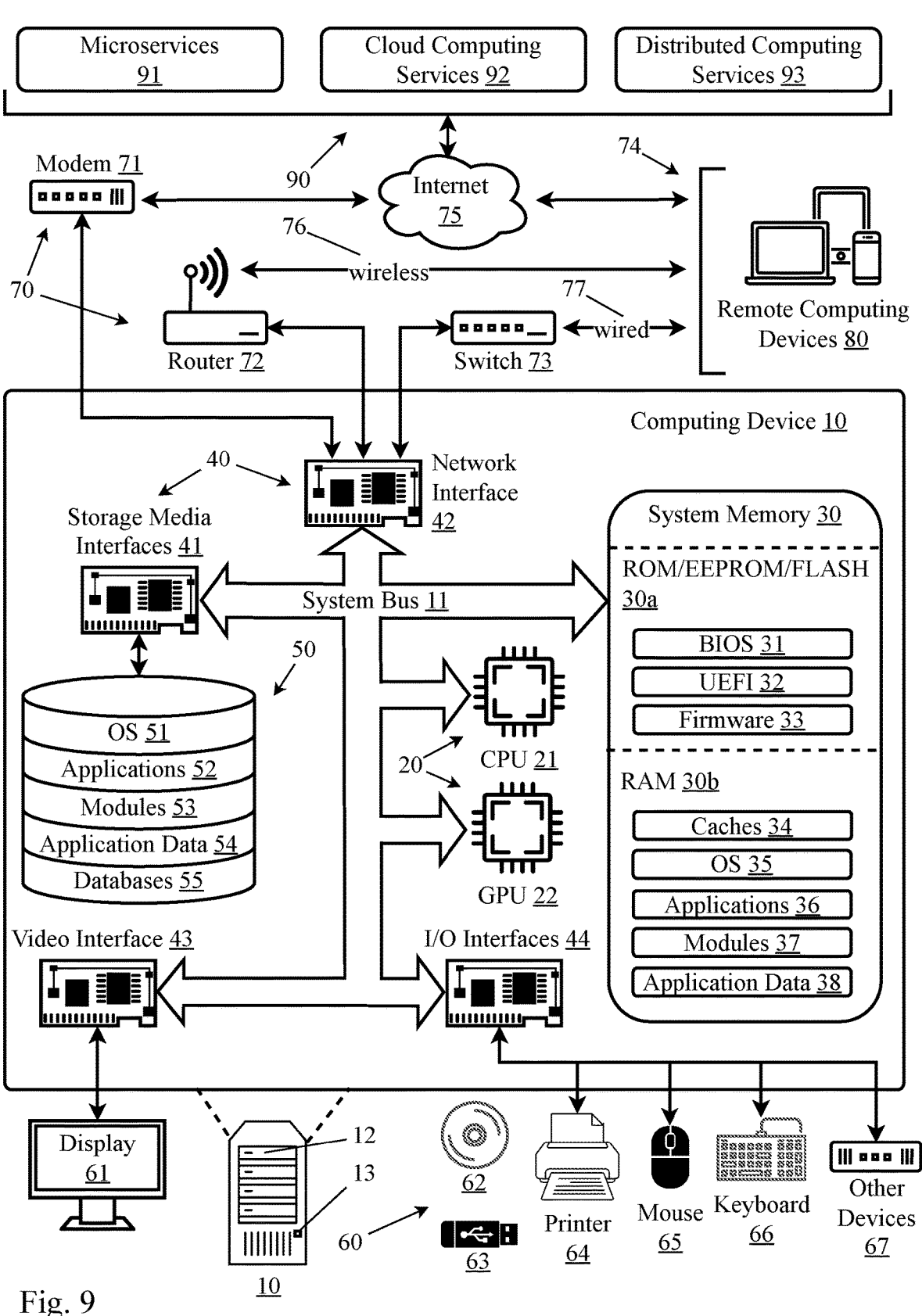
FIG. 9 illustrates an exemplary computing environment on which an embodiment described herein may be implemented.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media.

Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for computer detection of forged authentication object cybersecurity attacks, comprising:

a computing device comprising a memory, a processor, and a non-volatile data storage device;

an authentication object master ledger stored on the non-volatile data storage device, the authentication object master ledger comprising authentication objects captured from one or more domain controllers of a computer network;

an authentication object agent installed on and operating on the one or more domain controllers of the computer network, the authentication object agent configured to capture each authentication object received by each of the domain controllers from a key distribution center and send it to an authentication object security system;

the authentication object security system comprising a first plurality of programming instructions stored in the memory which, when operating on the processor, causes the computing device to:

receive the authentication objects from the authentication object agent installed on and operating on the one or more domain controllers; and store each received authentication object or a unique identifier associated with each authentication object in the authentication object master ledger;

receive a first authentication object presented to a first domain controller of the one or more domain controllers from a first authentication object agent installed on and operating on the first domain controller, the first authentication object being presented to the first domain controller for access to a resource of the computer network or a federated service associated with the computer network;

compare the first authentication object or a unique identifier associated with the first authentication object with the master ledger to determine whether an identical authentication object or unique identifier already exists in the master ledger; and where the first authentication object or a unique identifier associated with the first authentication object is not contained in the master ledger, instruct the first authentication object agent to send a destroy ticket command from the first domain controller to the key distribution center.

2. The system of claim 1, wherein the computing device is part of the computer network.

3. The system of claim 1, wherein the computing device is part of a cloud-based service.

4. The system of claim 1, wherein the unique identifier stored for each received authentication object is a cryptographic hash of each authentication object, and the unique identifier for the first authentication object is a cryptographic hash of the first authentication object.

5. The system of claim 1, wherein the authentication objects are tickets issued by a ticket granting service of the key distribution center.

6. The system of claim 1, further comprising:

an authentication object log extension database stored on the non-volatile data storage device, the authentication object log extension database comprising additional log data for authentication objects issued by the key distribution center, the additional log data comprising a start time, an end time, and a renewal time for each authentication object issued by the key distribution center; and the authentication object log extension utility installed on and operating on one or more local host computers of the computer network, the authentication object log extension utility configured to perform the following for the local host computer on which it is installed:

enumerate every logon session on the local host computer;

query the local ticket cache of the local host computer to obtain a log data stream for each logon session;

generate the additional log data to supplement the log data stream for each logon session; and store the additional log data as part of the log data stream for the logon session;

wherein the authentication object security system is further configured to cause the computing device to:

receive the additional log data generated by the authentication object log extension utility for each local host computer of the one or more local host computers;

monitor access requests by a client operating on a first local host computer of the one or more local host computers for access to resources on the computer network;

identify a first authentication object presented by a first local host computer for access to a network resource of the computer network, the first authentication object comprising a client name;

retrieve a user session name from the first local host computer associated with the attempted access using the first authentication object;

compare the client name with the user session name; and where there is a mismatch between the client name and user session name, send a destroy ticket command to the key distribution service.

7. The system of claim 6, wherein the computing device is the local host computer, and the authentication object security system is operating on the local host computer.

8. The system of claim 6, wherein the computing device is part of a cloud-based service.

9. A method for computer detection of forged authentication object cybersecurity attacks, comprising the steps of:

storing an authentication object master ledger stored on a non-volatile data storage device of a computing device comprising a memory, a processor, and the non-volatile data storage device, the authentication object master ledger comprising authentication objects captured from one or more domain controllers of a computer network;

installing an authentication object agent on the one or more domain controllers of the computer network, the authentication object agent configured to capture each authentication object received by each of the domain controllers from a key distribution center and send it to an authentication object security system;

using the authentication object security system stored in the memory and operating on the processor of the computing device to:

receive the authentication objects from the authentication object agent installed on and operating on the one or more domain controllers; and store each received authentication object or a unique identifier associated with each authentication object for each received authentication object in the authentication object master ledger;

receive a first authentication object presented to a first domain controller of the one or more domain controllers from a first authentication object agent installed on and operating on the first domain controller, the first authentication object being presented to the first domain controller for access to a resource of the computer network or a federated service associated with the computer network;

compare the first authentication object or a unique identifier associated with the first authentication object with the master ledger to determine whether an identical authentication object or unique identifier already exists in the master ledger; and where the first authentication object or a unique identifier associated with the first authentication object is not contained in the master ledger, instruct the first authentication object agent to send a destroy ticket command from the first domain controller to the key distribution center.

10. The method of claim 9, wherein the computing device is part of the computer network.

11. The method of claim 9, wherein the computing device is part of a cloud-based service.

12. The method of claim 9, wherein the unique identifier stored for each received authentication object is a cryptographic hash of each authentication object, and the unique identifier for the first authentication object is a cryptographic hash of the first authentication object.

13. The method of claim 9, wherein the authentication objects are tickets issued by a ticket granting service of the key distribution center.

14. The method of claim 9, further comprising the steps of:

storing an authentication object log extension database on the non-volatile data storage device, the authentication object log extension database comprising additional log data for authentication objects issued by the key distribution center, the additional log data comprising a start time, an end time, and a renewal time for each authentication object issued by the key distribution center; and installing the authentication object log extension utility installed on one or more local host computers of the computer network, the authentication object log extension utility configured to perform the following for the local host computer on which it is installed:

enumerate every logon session on the local host computer;

query the local ticket cache of the local host computer to obtain a log data stream for each logon session;

generate the additional log data to supplement the log data stream for each logon session; and store the additional log data as part of the log data stream for the logon session;

wherein the authentication object security system is further configured to cause the computing device to:

receive the additional log data generated by the authentication object log extension utility for each local host computer of the one or more local host computers;

monitor access requests by a client operating on a first local host computer of the one or more local host computers for access to resources on the computer network;

identify a first authentication object presented by a first local host computer for access to a network resource of the computer network, the first authentication object comprising a client name;

retrieve a user session name from the first local host computer associated with the attempted access using the first authentication object;

compare the client name with the user session name; and where there is a mismatch between the client name and user session name, send a destroy ticket command to the key distribution service.

15. The method of claim 14, wherein the computing device is the local host computer, and the authentication object security method is operating on the local host computer.

16. The method of claim 14, wherein the computing device is part of a cloud-based service.

* * * * *